United States Patent
Minami

(10) Patent No.: US 7,557,865 B2
(45) Date of Patent: Jul. 7, 2009

(54) DISPLAY CONTROL APPARATUS AND PROGRAM

(75) Inventor: Tsuyoshi Minami, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 1010 days.

(21) Appl. No.: 10/996,214

(22) Filed: Nov. 22, 2004

(65) Prior Publication Data

US 2005/0117060 A1    Jun. 2, 2005

(30) Foreign Application Priority Data

Nov. 28, 2003    (JP)    ............... 2003-398720

(51) Int. Cl.
H04N 5/278    (2006.01)
(52) U.S. Cl. .................................... 348/589
(58) Field of Classification Search ................ 348/468, 348/461, 465, 473, 478, 563, 564, 589, 592, 348/600
See application file for complete search history.

(56) References Cited

U.S. PATENT DOCUMENTS

| 5,126,832 | A | | 6/1992 | Lee et al. | |
| 5,287,172 | A | | 2/1994 | Lee | |
| 5,500,680 | A | * | 3/1996 | Lee | 348/468 |
| 5,519,443 | A | * | 5/1996 | Salomon et al. | 348/467 |
| 5,734,437 | A | * | 3/1998 | Back | 348/563 |
| 6,661,467 | B1 | * | 12/2003 | Van Der Meer et al. | 348/564 |
| 2002/0067433 | A1 | | 6/2002 | Yui et al. | |
| 2006/0064716 | A1 | * | 3/2006 | Sull et al. | 725/37 |

FOREIGN PATENT DOCUMENTS

| EP | 0 475 035 A2 | 7/1991 |
| JP | 6-6772 A | 1/1994 |
| JP | 7-50843 A | 2/1995 |
| JP | 8-289262 A | 11/1996 |
| JP | 11-8807 A | 1/1999 |
| JP | 2000-50220 A | 2/2000 |
| JP | 2002-199354 A | 7/2002 |
| JP | 2002-314891 A | 10/2002 |
| JP | 2002-353829 A | 12/2002 |
| JP | 2002-353915 A | 12/2002 |
| JP | 2003-161620 A | 6/2003 |

* cited by examiner

*Primary Examiner*—Paulos M Natnael
(74) *Attorney, Agent, or Firm*—Frishauf, Holtz, Goodman & Chick, P.C.

(57) ABSTRACT

When a digital broadcast bearing character information multiplexed with video information is received, image processing is performed in consideration of the video information that composes the background of characters to be displayed, thereby displaying the characters with high distinction without impairing the video quality. A display control apparatus comprises a CPU (12), responsive to reception of the digital broadcast, for defining a display area for characters contained in the character information on a picture displayed on a display unit (10) based on a display position, number and size of the characters; analyzes a hue of video information corresponding to the display area; and produces and displays images of the characters with a hue different from that of the video information in the display area based on a result of the analysis (FIG. 1).

18 Claims, 22 Drawing Sheets

FIG.12

DISPLAY CONTROL APPARATUS AND PROGRAM

BACKGROUND OF THE INVENTION

1. Field of the Invention

The present invention relates generally to display control apparatus and program, and more particularly to such display and control apparatus and program for displaying both video and character information on a television receiver.

2. Description of the Related Art

In television broadcasts, the practical use of ground-wave television broadcasts as well as BS (Broadcast Satellite) digital broadcasts has been advanced in a digital system. In such digital television broadcast, character information including news flashes and/or subtitles combined in a multiplexed manner is received in addition to the video information. The receiver processes images on the character information as well as the received video information, thereby customizing the display colors, sizes and/or fonts of the characters included.

In the past, many proposals have been made for receivers that receive the BS digital broadcasts and ground-wave television broadcasts. For example, Published Unexamined Japanese Patent Application Hei 11-8807 discloses a digital broadcast receiver by which the viewer can easily recognize the content of a program being broadcasted in each channel at present and display in a short time a list of channels that inform the viewer of channel information available. According to this arrangement, when character information representing respective channel programs and titles of all or part of receivable channels is displayed in the list of channels, this list and images of programs being broadcasted at present in certain ones of the channels of the list are displayed.

Published Unexamined Japanese Patent Application 2000-50220, discloses a teletext receiver by which the viewer can easily recognize what teletext programs are being broadcasted at present and easily select a desired program. This publication discloses means for displaying a plurality of teletext programs decoded or a plurality of pages of the same program each in a compressed state on a smaller picture than the original display screen and superimposed such that they are shifted sequentially by at least one line.

Published Unexamined Japanese Patent Application 2002-199354 discloses a digital broadcast receiver in which the size of a display area for character information and the display position of the character information are changeable. In this arrangement, even when a television broadcast program is displayed in a compressed manner, corresponding credit titles can be displayed in an easy-to-see manner. This arrangement comprises a controller that changes a value of control information annexed to the received character information based on a display position of a video picture of the television broadcast program received, thereby moving the display position of the character information on the picture.

Published Unexamined Japanese Patent Application 2002-353829 discloses a ground-wave digital broadcasting receiver and an information acquiring and supplying apparatus in which even when the viewer moves from his or her reception area during viewing a program, he or she is able to continue to view the program that he or she has viewed so far. According to this arrangement, when a ground-wave digital broadcast is received and demodulated, thereby providing its video and voice signals, the viewer acquires station select information from an information source, for example an FM teletext, different from the ground-wave digital broadcast and then selects a desired station based on the acquired station select information.

Published Unexamined Japanese Patent Application 2002-353915 discloses a mobile information terminal that performs a schedule management function, a calendar function, a simple-document creating function, an electronic mail function and a function to receive a partial service of the ground-wave digital broadcast. This terminal comprises a tuner that selects a ground-wave digital broadcast and produces a corresponding transport stream, a separator that extracts added information from the transport stream, a generator that generates an electronic program guide image based on the added information, a specifying unit that specifies any one of displayed programs on the electronic program guide picture and a delivering unit that delivers information that specifies the specified program directly or via an externally connected communication device to an output line. Further, it produces a data broadcast image based on the added information.

Published Unexamined Japanese Patent Application 2003-161620 discloses a car navigation system that uses a ground-wave digital broadcast to receive area information such as area map information included in the ground-wave digital broadcast. This system comprises a stored-data reader that reads desired map data from map media that have stored map data, a broadcast receiver that receives the ground-wave digital broadcast, a storage device that has stored map data, position sensing means that detects the present position of the user's car using a GPS, a display that displays the map data, an input device by which the user can select information, and a control processor that controls these elements.

Although these prior art technical literatures disclose techniques for displaying video and character information, they fail to refer to image processing for character information in consideration of video information that represents the background of characters to be displayed.

In the digital broadcast, credit titles to be displayed in association with the content of the television broadcasting program are arranged to be displayed at a predetermined position on a displayed picture of the television broadcasting program by the teletext including data, characters and credit titles. Especially, in the Published Unexamined Japanese Patent Application 2002-199354 an arrangement is disclosed that solves a problem that when the television broadcasting program and the data broadcast content are displayed in a multi-picture screen, the data broadcast content is difficult to view because it is hidden by the credit titles. The technique automatically calculates a value of a position where the credit titles start to be displayed with the position of a lower left corner of the video picture as a reference in a state in which the video picture of the television broadcasting picture is displayed in a compressed manner, and displays the credit titles near the video picture in an easy-to-see manner. However, this technique does not solve a problem that when displayed, superimposed on the video information that represents the background, the character information will be difficult to view.

Usually, the character information is displayed, superimposed on the video information that represents the background. Thus, it is difficult to discriminate the character information from its background depending on the content of the background, thereby lowering the distinction of the character information. For example, when the video is similar in display color to the characters or the contrast in brightness between the video and the characters is small, the distinction of characters is low and the characters are difficult to recognize. When a news flash, for example, of a natural disaster or accident is displayed in large characters on the picture to attract the viewers' attention, the picture quality would greatly be deteriorated.

SUMMARY OF THE INVENTION

The present invention solves the aforementioned problems. It is an object of the present invention to provide a display control apparatus and program, responsive to receiving a digital broadcast bearing character information multiplexed with video information, for performing image processing in consideration of the video information as the background of the characters to be displayed, thereby displaying the characters with high distinction without damaging the video quality.

Another object is to provide a display control apparatus and program, responsive to receiving a digital broadcast bearing character information multiplexed with video information, for displaying the characters with high distinction such as attracts the viewer's attention without spoiling the video quality when special information indicative of warning is included in the character information to be displayed.

In accordance with one aspect of the present invention, there is provided a display control apparatus comprising: a character information analyzer, responsive to reception of a television broadcast signal bearing video information and character information, for defining a display area for characters contained in the character information on a picture displayed on a display unit based on the display position, number and size of the characters; a video information analyzer that analyzes video information corresponding to the display area for the characters defined by the character information analyzer; and a character image producing unit that produces an image of each of the characters to be displayed in the display area based on a result of the analysis by the video information analyzer.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 12 illustrates that one of the character subareas of FIG. 11 is composed of 30 pixel wide×30 pixel high;

DETAILED DESCRIPTION OF THE INVENTION

The first-tenth embodiments of the display control apparatus according to the present invention implemented in a mobile receiver that receives a ground-wave digital broadcast, as an example will be described with reference to the accompanying drawings.

Figure 1:
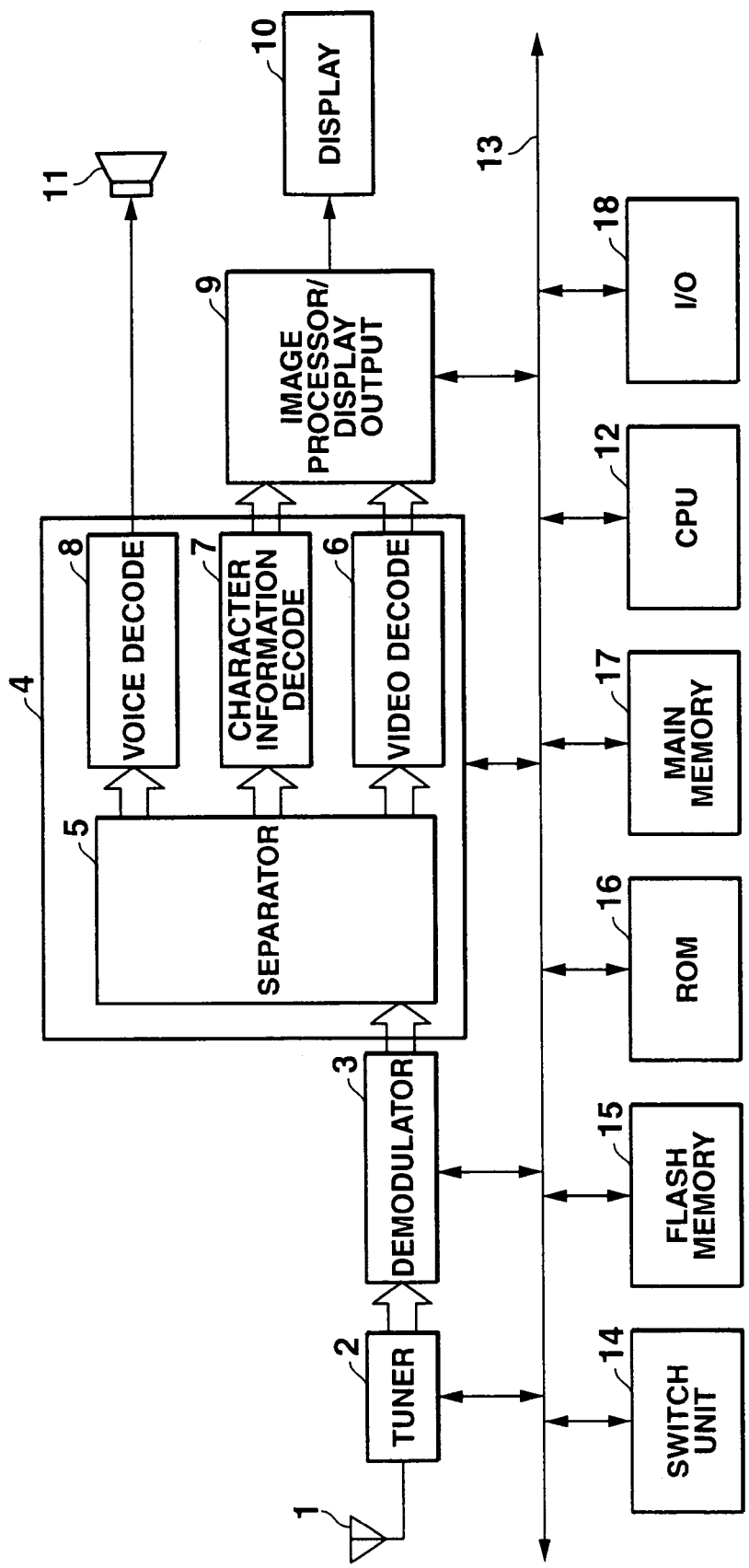
FIG. 1 is a block diagram of a receiver implementing each of first-tenth embodiments of a display control apparatus of the present invention.

FIG. 1 is a block diagram of the receiver. In FIG. 1, a tuner 2 from among digital-broadcast radio waves received by an antenna 1 and then demodulated as encoded digital information by a demodulator 3 selects a desired-channel radio wave. The demodulated digital information is then decoded by a decoder 4 and separated by a separator 5 into video, character and voice information. A video decoder 6, the character information by a character information decoder 7 and the voice information by a voice decoder 8 decode the video information. The decoded video and character information are then inputted to an image processor/display output unit 9, which then performs on the information image/display output processing to be described later. The image processor/display output unit 9 corresponds to the claimed character information analyzer, video information analyzer and character image producing unit. A resulting signal is then delivered to, and displayed by, a display such as a liquid crystal display 10. The decoded voice information is delivered to a speaker 11, which then lets off a corresponding sound.

A CPU 12 controls the tuner 2, demodulator 3, decoder 4 and image processor/display output unit 9 via a system bus 13. The system bus 13 is connected to a switch unit 14, a flash memory 15, a ROM 16, a main memory 17, an I/O interface 18, which are controlled by the CPU 12. The switch unit 14 includes a channel switch, an image recording switch and a replay switch. The respective states of these switches are detected by a scanning operation of the CPU 12. The flash memory 15 is a rewritable non-volatile memory capable of recording video and character information processed by the image processor/display output unit 9 and voice information obtained from the voice decoder 8. The ROM 16 has stored a control program, for example a display control program, to be executed by the CPU 12. The main memory 17 composes a working area for the CPU 12 and temporarily stores data that will be produced by execution of the control program. The I/O interface 18 connects to external devices and/or a network such as the Internet to communicate data. The receiver also comprises a STB (Set Top Box) (not shown) that comprises receiving means capable of recording viewers' zip codes as viewer information. Thus, the CPU 12 is capable of recognizing its present position based on the viewer information. In addition to the STB, the receiver may further comprise a GPS (Global Positioning System) as receiving means to detect its position.

Figure 2:
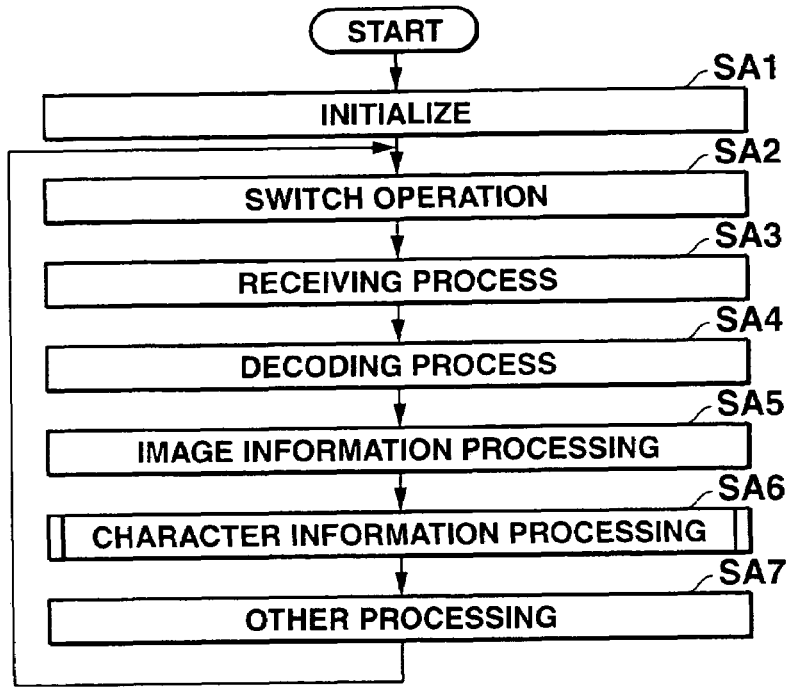
FIG. 2 is a flowchart of a main routine indicative of operation of the receiver.

Operation of the receiver of FIG. 1 will be described next with reference to FIGS. 2-23. FIG. 2 is a flowchart indicative of a main routine common to the respective embodiments. After performing a predetermined initializing process (step SA1), control performs a looping process including a switch operating process (step SA2), a receiving process (step SA3), a decoding process (step SA4), a video information processing operation (step SA5), a character information processing operation (step SA6), and other processing operations (step SA7).

In the switch operating process, information on operation of any particular switch is stored in the main memory 17. When a channel switch is operated in the receiving process, information on the operation of the channel switch commands the tuner 2 to select a corresponding channel. In the decoding process, the decoder 4 is commanded to perform a decoding process. In the video information processing operation, the decoded video information is developed as bit map information for one picture and then delivered to the display 10. In the character information processing operation, the character information is analyzed, bit map information representing the video as a background of the characters is examined and corresponding character pictures are produced. The character information processing operation varies from embodiment to embodiment. Thus, its operation will be described later for a respective one of the embodiments. The other processing operations at step SA7 include, for example, operating the recording switch or replay switch to access the flash memory 15, thereby performing the recording or replaying process, communicating data with an external device/network via the I/O interface 18, and sensing the present position of the receiver using the STB or GPS.

Operation of the character display control process in the first embodiment will be described next with respect to a flowchart of FIG. 3. Control determines whether a character string has been received (step SB1). If not, the control terminates the flowchart and then returns to the main routine. When the character string is received, the control detects the display area, number and size of characters from among the character information (step SB2). Then, the control examines a background of the display area of the characters, that is, bit map information representing the video information (step SB3). In this case, the control examines a hue of the video information.

For example, if the maximum number of characters included in one line is 20 with each character having a display area that comprises 30 pixels wide×30 pixels high, the whole display area of the characters of one line includes 18000 pixels (=600 pixels wide×30 pixels high). Thus, the hue of video information included in each pixel is examined based on red (R), green (G) and blue (B) components of the video information of that pixel.

Figure 4:
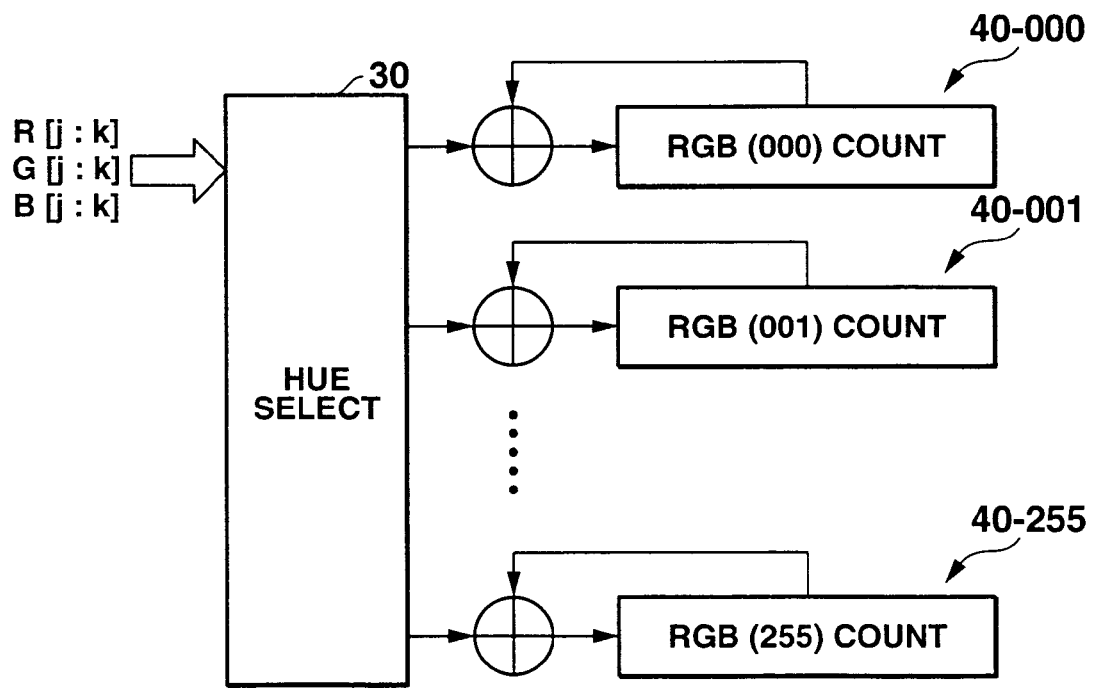
FIG. 4 schematically illustrates a hue examining circuit of the first embodiment.

FIG. 4 is a block diagram of a hue examining circuit of the image processor/display output unit 9 of FIG. 1. A hue selector 30 determines which of 256 (=0-255) kinds of hue criteria each of the 18000 pixels corresponds to, using an R [j, k], a G [j, k] and a B [j, k] that are the red, green and blue components, respectively, of each pixel [j, k] (j=0-599, k=0-29) to be examined. When determining which of the hue criteria that pixel corresponds to, the hue selector outputs data "1" to a corresponding one of 256 accumulating circuits 40-000, 40-001, ... and 40-255. As a result, the frequencies of the hues of the 18000 pixels obtained are represented by RGB (000), RGB (001), ..., and RGB (255) counts, respectively.

Figure 5:
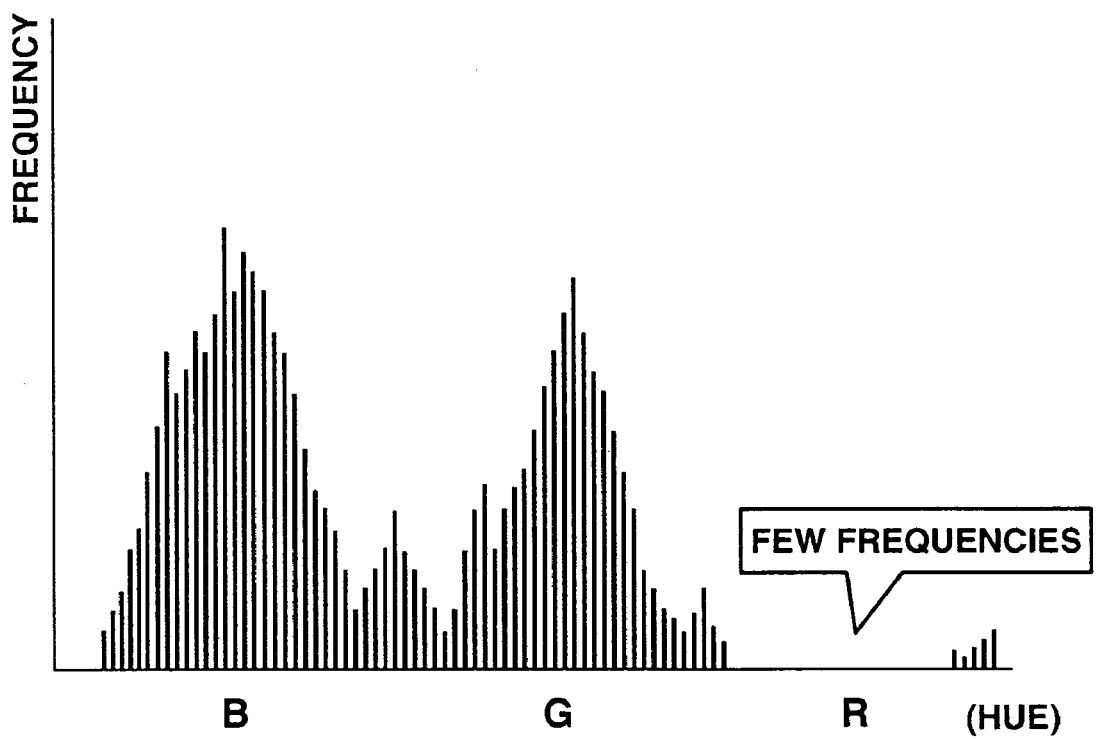
FIG. 5 is a histogram of a result of the hue examination in the first embodiment.

FIG. 5 illustrates a histogram of the frequency of the hues of the 1800 pixels obtained. As will be obvious, in the example the frequencies of the respective R (red) hues are very low compared to those of the respective G (green) hues and those of the respective B (blue) hues. In this case, characters with high distinction can be displayed in red.

Figure 6:
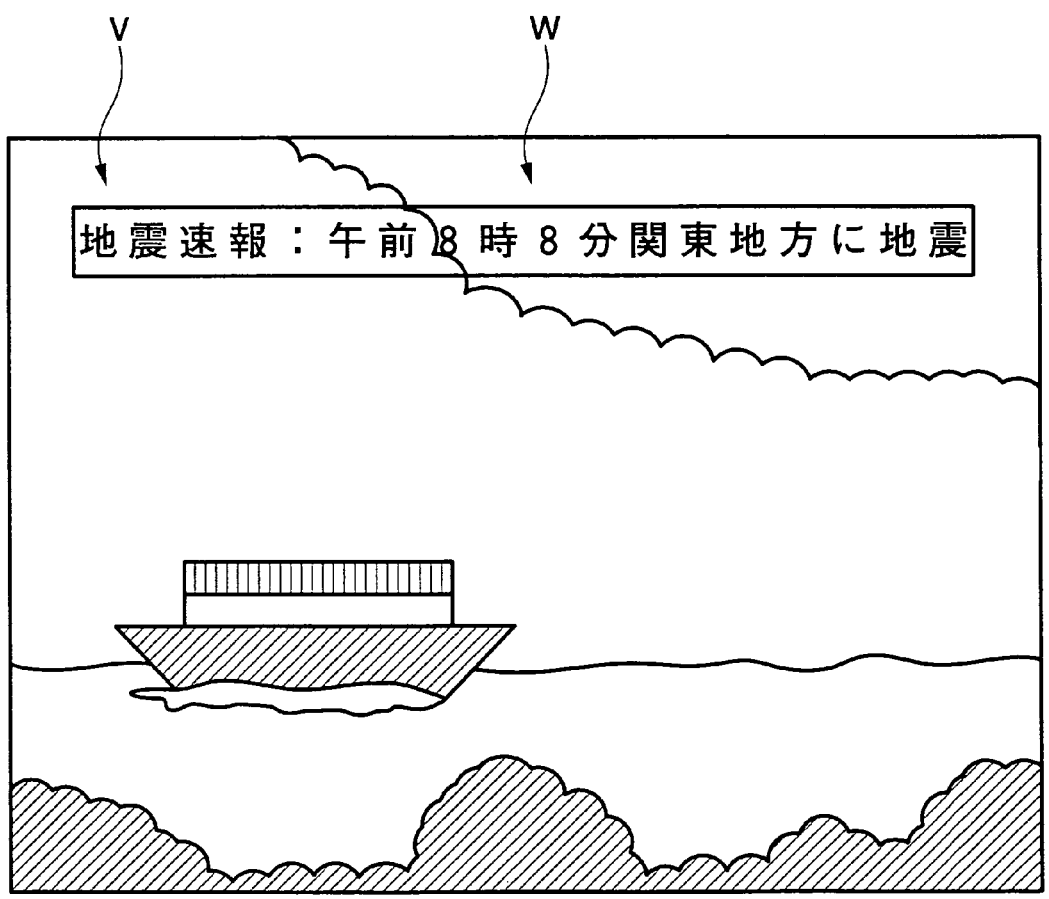
FIG. 6 illustrates a picture of video and character information displayed on a display screen of the first embodiment.

For example as shown in FIG. 6, when a video of the background corresponding to the character display area comprises a mountain part V rich in green and a sky part W rich in blue, the frequencies of the respective red hues are very low compared to those of the respective green hues and those of the respective blue hues. Thus, in this case the characters can be displayed with high distinction by image processing, for example, the characters of the news flash can be displayed in red.

Figure 3:
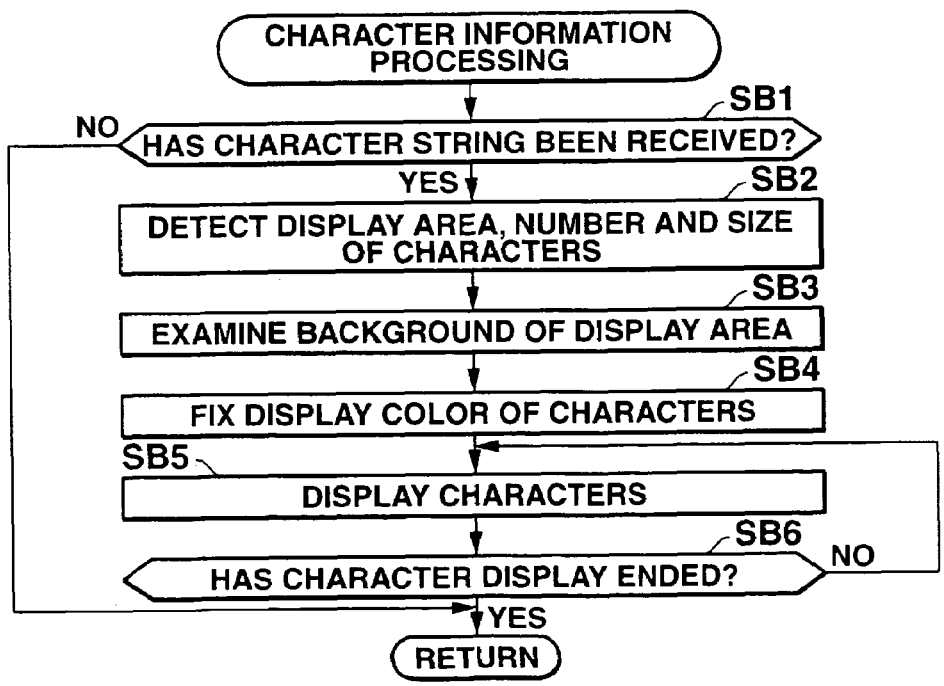
FIG. 3 is a flowchart indicative of character information processing of the first embodiment in the main routine of FIG. 2.

At step SB3 of the FIG. 3 flowchart, after examining the background of the display area the control fixes the display color of characters based on the result of the examination (step SB4) and then displays the characters in the fixed color (step SB5). Then, the control determines whether display of all the characters has ended (step SB6). If so, the control erases the character information displayed and then returns to the main routine.

As described above, according to this first embodiment, when a television broadcast signal bearing the video and character information is received the display area of characters included in the character information to be displayed on the display picture screen of the display means is defined based on the display position, number and size of the characters. The hue of the video information corresponding to the display area is analyzed and the images of characters in the display area are produced and displayed in a hue different from that of the video information.

Thus, when a digital broadcast of character information multiplexed with video information is received, image processing can be performed in consideration of the video information as the background of characters to be displayed, thereby displaying the characters with high distinction without spoiling the video quality.

Operation of a display control process to be performed in the second embodiment will be described next. In this embodiment a luminance of a background of the display area of the characters will be examined. A flowchart indicative of the character information processing is obtained by replacing "display color" at step SB4 of the flowchart of the FIG. 3 first embodiment with "luminance". Thus, presentation of the flowchart indicative of the character information processing of the second embodiment will be omitted.

Figure 7:
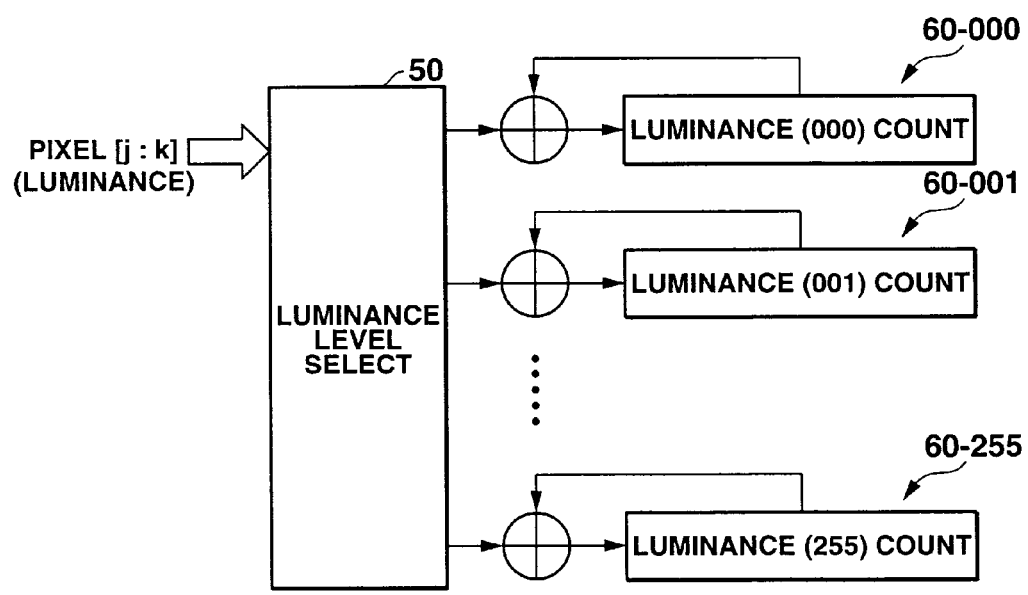
FIG. 7 schematically illustrates a luminance examining circuit of the second embodiment.

FIG. 7 is a block diagram indicative of a luminance level examining circuit of the FIG. 1 image processor/display output unit 9. In this case, a luminance level selector 50 determines which of 256 (=0-255) kinds of luminance criteria the luminance of each of the 18000 pixels [j, k] (where j=0-599, k=0-29) corresponds to. When determining which of the 256 different luminance criteria the luminance of that pixel corresponds to the luminance of that pixel, the luminance level selector 50 outputs data "1" to a corresponding one of accumulating circuits 60-000, 60-001, and 60-255. As a result, the frequencies of luminances of the 18000 pixels obtained are represented by luminance counts (000), (001), . . . , and (255), respectively.

Figure 8:
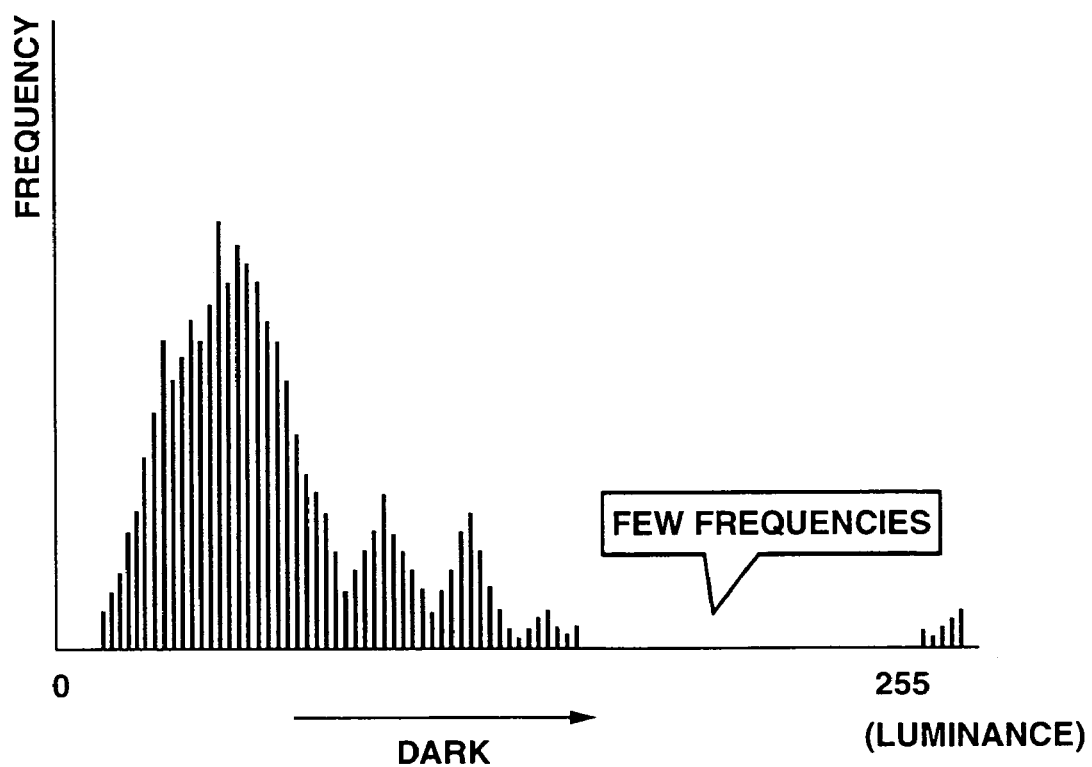
FIG. 8 is a histogram of a result of luminance examination performed in the second embodiment.

FIG. 8 illustrates a histogram of the frequency of the luminances of the pixels obtained. As will be obvious from FIG. 8, in this example the frequencies of the background pixels with low luminance are very low compared to those of the background pixels with high luminance. That is, the display area of characters has a bright background. In this case, by displaying dark characters with low luminance, the characters can be displayed with high distinction. Conversely, when the frequencies of the background pixels with high luminance are very small compared to those of the background pixels with low luminance, the display area of characters has a dark background. In this case, by increasing the luminance of characters, thereby displaying bright characters, the characters can be displayed with high distinction.

As described above, according to this second embodiment, when a television broadcast signal bearing video and character information is received the display area of characters included in the character information to be displayed on the display screen of display means is fixed based on the display position, number and size of the characters. The hue of the video information corresponding to the display area is analyzed and images of characters in the display area are produced and displayed with a luminance different from that of the video information.

Thus, as in the first embodiment, when a digital broadcast bearing character information multiplexed with video information is received, image processing can be performed in consideration of the video information as the background of characters to be displayed, thereby displaying the characters with high distinction without spoiling the video quality.

Figure 9:
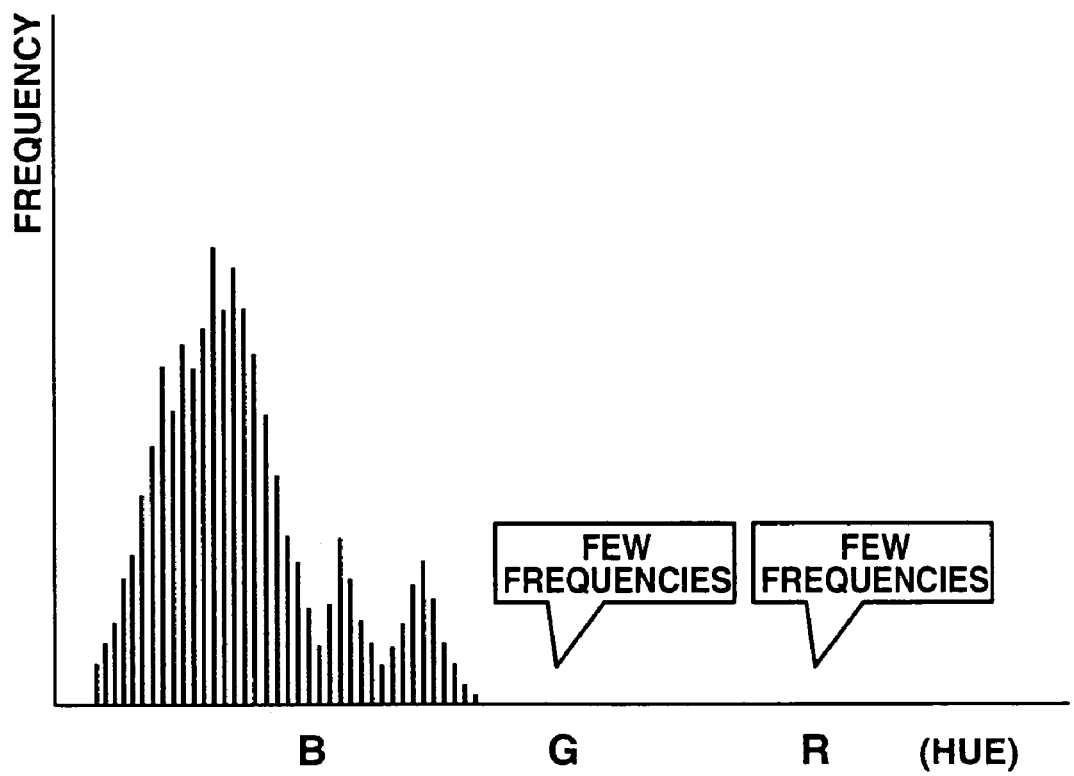
FIG. 9 is a histogram of a result of hue examination performed in the second embodiment.

A modification of the second embodiment comprises a combination of the first embodiment and a circuit that examines the background hue. Thus, when a result of the examination expressed by a histogram where the frequencies of the respective G hues and the respective R hues are low compared to those of the respective B hues, as shown in FIG. 9, is obtained in addition to the result of the examination shown by the histogram of the frequency of the luminances shown in FIG. 8, a bright sky background is imagined. Thus, in this case, the characters are displayed with higher distinction by producing images of red and green characters with low luminance.

A character display control process to be performed in the third embodiment will be described next with respect to a flowchart of FIG. 10. Control first determines whether a character string has been received (step SC1). If not, the control terminates this flowchart and then returns to the main routine. If the character string is received, the control detects the display area, number and size of the characters from among the character information (step SC2). Then, the control divides the display area into subareas for the respective characters (step SC3). Then, the control examines the background of each subarea (step AC4).

Figure 10:
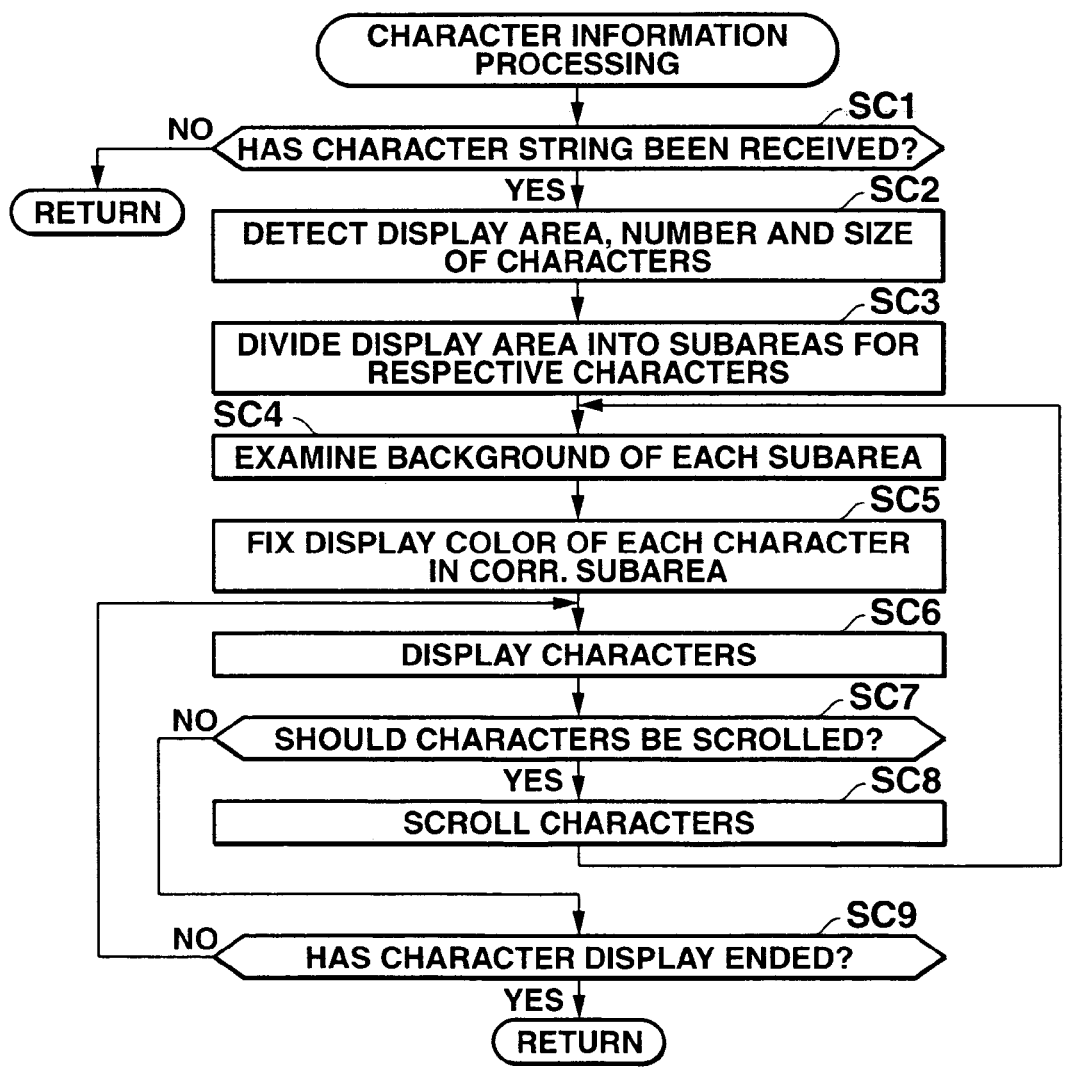
FIG. 10 is a flowchart of character information processing to be performed in the third embodiment in the main routine of FIG. 2.
Figure 11:
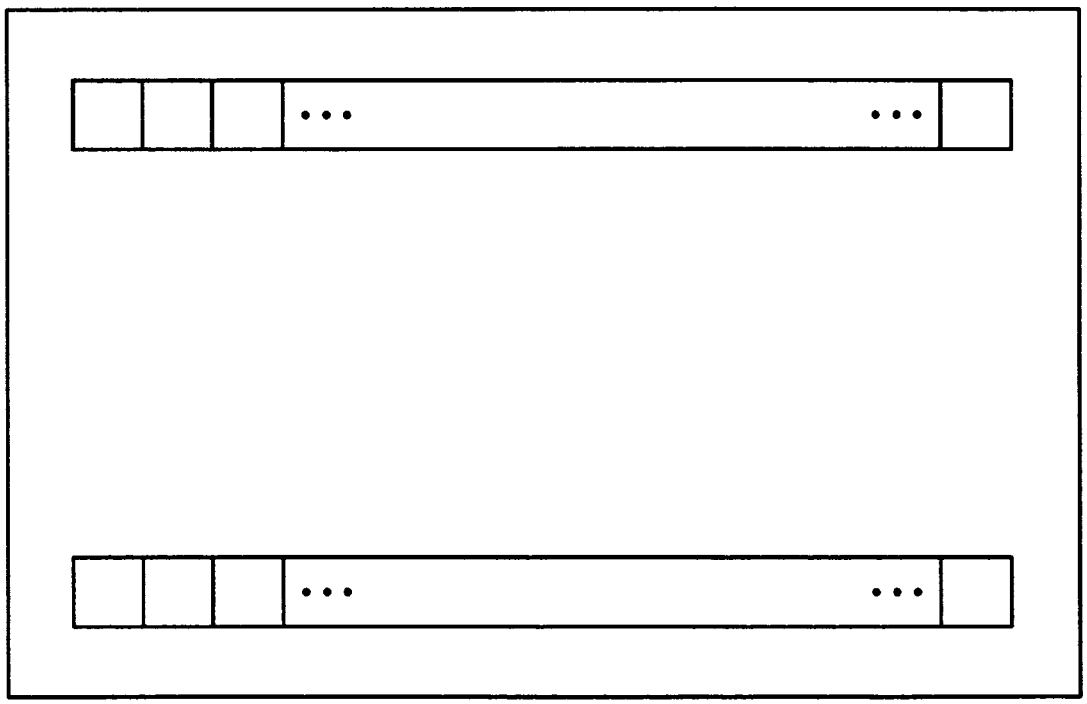
FIG. 11 illustrates a displayed picture in the third embodiment in which two upper and lower horizontal strip-like character display areas each of which is separated into subareas for respective characters are provided in upper and lower parts, respectively, of the displayed picture.
Figure 12:
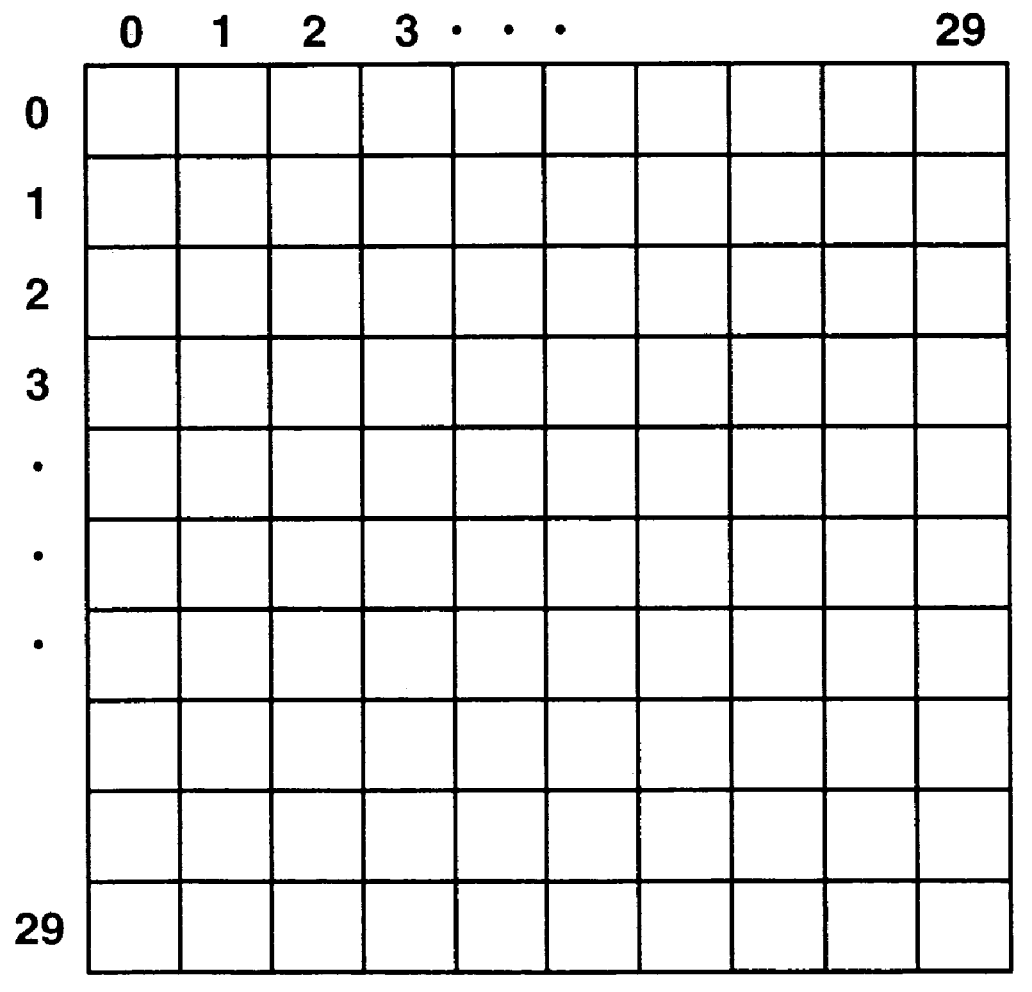

FIG. 11 illustrates two horizontal strip-like character display areas, each divided in units of a character, provided in an upper and a lower part of the picture. FIG. 12 schematically illustrates that one subarea is composed of 900 pixels (=30 pixels wide×30 pixels high). At step SC4 of the FIG. 10 flowchart, the control examines the background of each of the 900 pixels and analyzes a display color of video information for each subarea. The control then fixes the display color of a character for each subarea based on a result of the examination (step SC5). Then, the control displays the character in that color in the subarea (step SC6).

Figure 13:
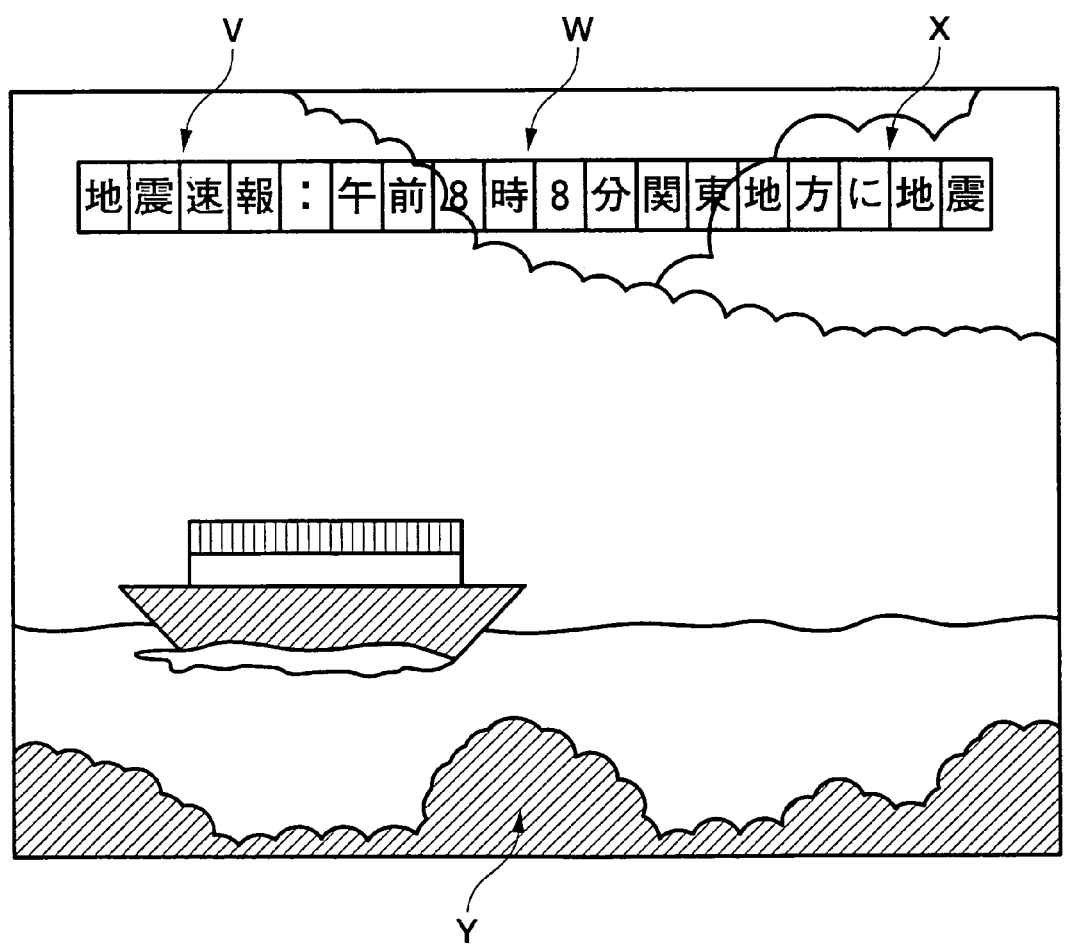
FIG. 13 illustrates a news flash on an earthquake displayed on a picture of the display screen in the third embodiment.

FIG. 13 illustrates a displayed news flash about occurrence of an earthquake. In the background, a video part V of the mountain has a high frequency of green hues, a video part W of the sky has a high frequency of blue hues, a video part X of a cloud is rich in white where the green, blue and red hues are substantially equal in frequency. Thus, characters in the video parts V and W are displayed in red and the characters in the video part X in black. When the video parts are desired to be displayed more minutely, the characters in the video parts V, W, and X are displayed in mulberry part, red and black, respectively.

Figure 14:
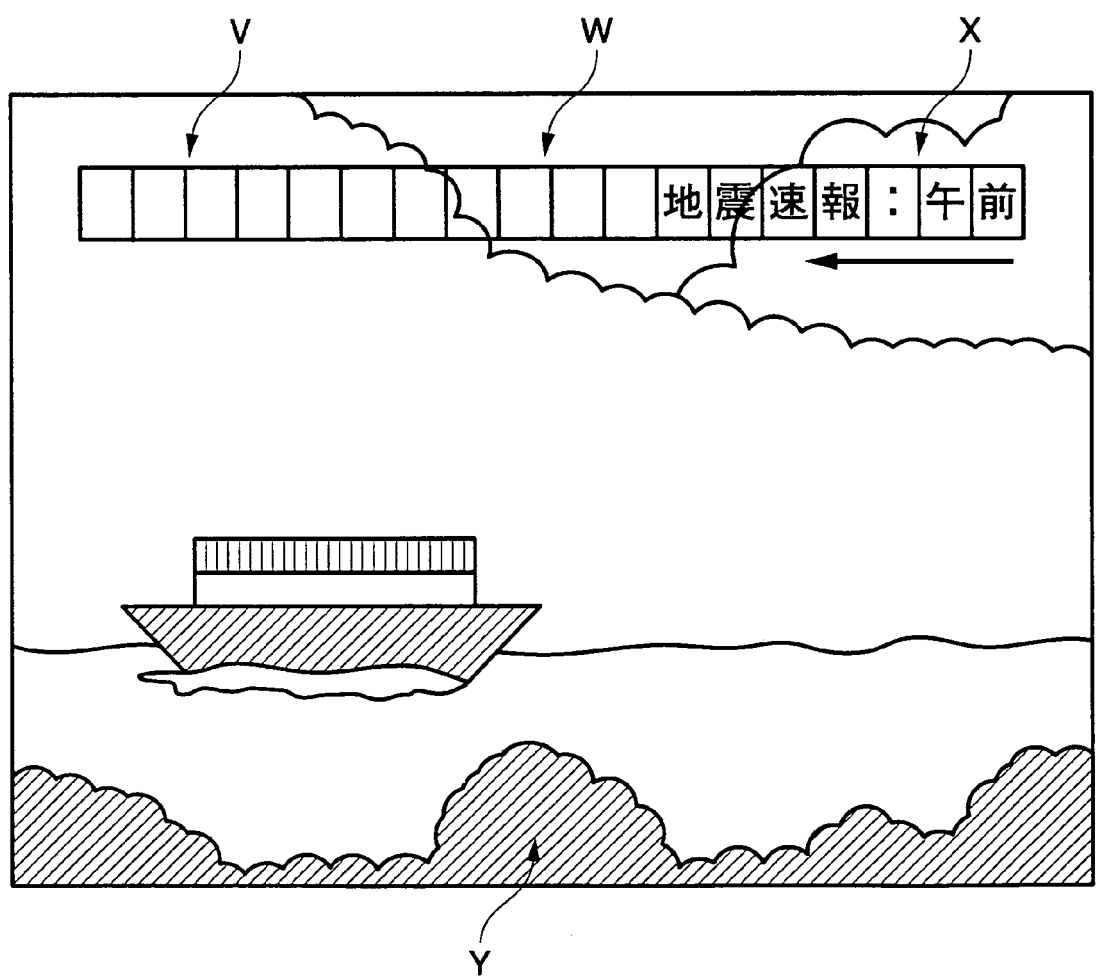
FIG. 14 illustrates scrolling of characters in the third embodiment.

If the characters are to be scrolled at step SC7 of the FIG. 10 flowchart, the control scrolls the characters (step SC8). The control then goes to step CS5 in which it fixes a display color of a character in each subarea. FIG. 14 illustrates the character scrolling. While scrolling, the characters displayed move at constant speeds, for example by one per second, in the direction of an arrow. That is, since the positions of the characters change at constant intervals of time, the respective display colors of the characters need be fixed for each scrolling.

If no scrolling is requested at step SC7, the control determines whether the character display has been terminated (step SC9). If so, the control then returns to the main routine.

As described above, according to the third embodiment the defined display area for the character string is divided into subareas for the respective characters. A hue of the video information corresponding to each of the subareas is analyzed, an image of a character in a corresponding subarea is produced and displayed in a display color of a hue different from the analyzed hue. When the character string is moved while being displayed in the character scrolling process, an image of each character is produced and displayed in a display color of the hue set in a corresponding subarea each time the character string is moved.

Thus, when a digital broadcast bearing character information multiplexed with video information is received, video information that represents the backgrounds of the characters to be displayed can be processed in units of a character, thereby displaying the characters with high distinction without impairing the video quality.

While in the third embodiment the hue of video information corresponding to each subarea is illustrated as analyzed, the luminance of video information corresponding to each subarea may be analyzed such that an image of a character in each subarea is produced with higher distinction without impairing the video quality.

A display control process to be performed in the fourth embodiment will be described next. In the aforementioned first-third embodiments, image processing including producing character images was performed on the assumption that the background hardly changed during the display period of the characters. However, a video of sports or a video of a landscape picked up, for example, from a moving train can change in units of a second or at higher speeds. In the fourth embodiment, it is intended to maintain the distinction of characters to be displayed even in a picture of a so fast moving background.

Figure 15:
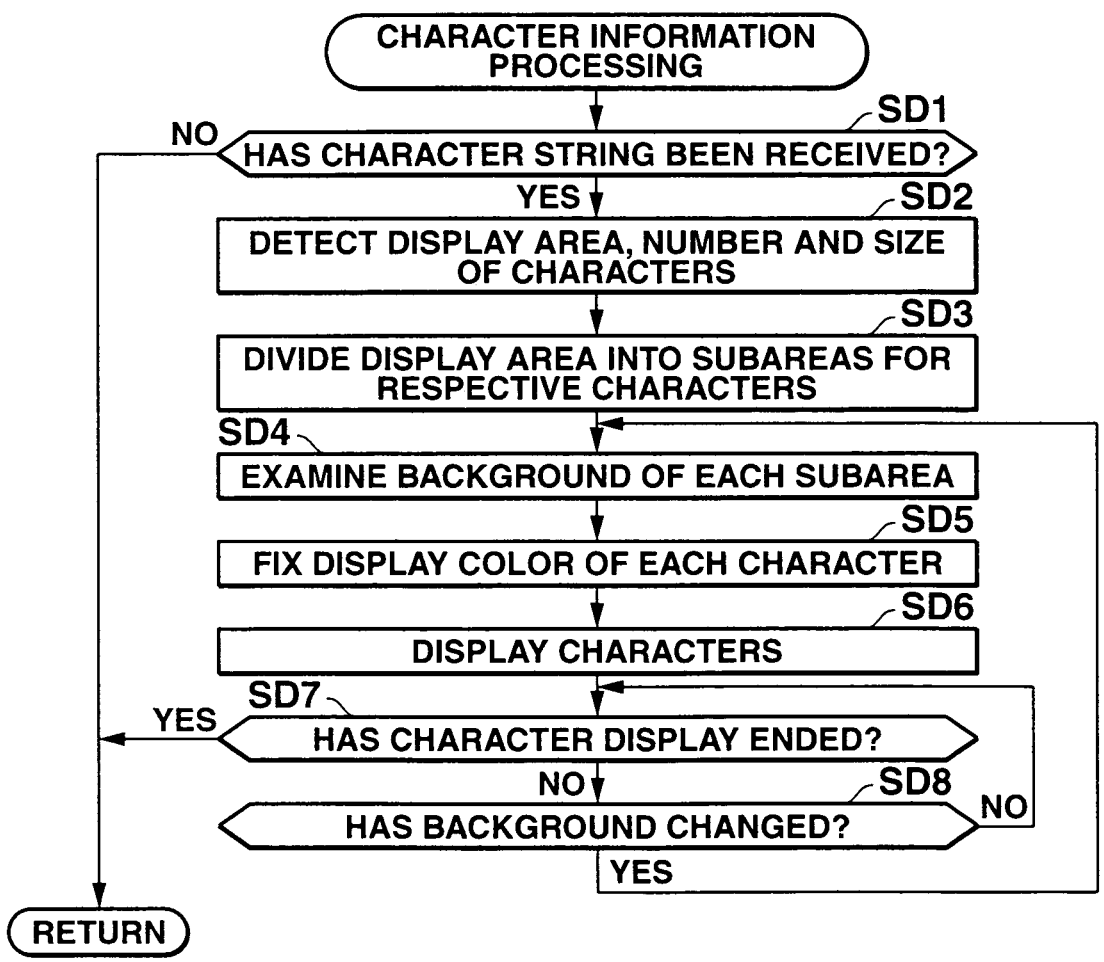
FIG. 15 is a flowchart indicative of character information processing to be performed in the fourth embodiment in the main routine of FIG. 2.

FIG. 15 is a flowchart of character information processing to be performed in the fourth embodiment. Control first determines whether a character string was received (step SD1). If not, the control terminates the flowchart and then returns to the main routine. When the character string was received, the control detects the display area, number and size of characters from among the character information (step SD2). Then, the control divides the display area into subareas for the respective characters (step SD3). The control then examines the background of each subarea (step SD4). The control then fixes the display color of a character for each subarea based on a result of the examination (step SD5) and then displays the character in that display color (step SD6). Then, the control determines whether the character display has been terminated (step SD7). If not, the control determines whether or not the background has changed during display of the character (step SD8). When the background has changed, the control goes to step SD4, where it examines the background of each subarea, fixes the display color of the corresponding character at step SD5 and then displays the character in the fixed color at step SD6. If the background does not change, the control determines at step SD7 whether the character display has been terminated. If so, the control returns to the main routine.

While in FIG. 15 the image processing to be performed when the color of the background has changed has been described, the looping process including steps SD4-SD7 is performed likewise when the luminance, or both the color and luminance, of the background has changed.

As described above, according to the fourth embodiment, when the video information changes during the display period of character information, the video information corresponding to the display area of the character is analyzed in response to the change in the video information, an image of the character in its display area is produced and displayed in a color contrasting with that of the video information each time the video information is analyzed.

Thus, when a digital broadcast bearing character information multiplexed with video information is received, image processing is performed in consideration of a change in the video information indicative of the background of a character to be displayed, thereby displaying the character with high distinction without impairing the quality of the fast moving video image.

Then, a display control process to be performed in the fifth embodiment will be described next. While in the respective aforementioned embodiments the display color and/or luminance of the background of the character in the display area are examined and the display color of the character is fixed, the background can include a part in which (1) the display color and luminance of the background are complicated, (2) their frequencies of the respective hues and luminances of the pixels of the background are equally distributed in the histogram, and (3) the character display is impossible. The fifth embodiment is intended to maintain high the distinction of a character to be displayed even when the background has a part where the character display is impossible. For example, it is assumed that when character information "震源地は○○南1 0≠ㅁ″" meaning "The seismic source is 10 kilometers south of ○○" is displayed in a horizontal strip-like display area provided in a lower part of the picture of FIG. 11, the display color and luminance of the background Y in the lower part of the picture are complicated and the frequencies of the respective hues and those of the respective luminance are equally distributed in its histogram, as shown in FIGS. 13 and 14, respectively.

Figure 16:
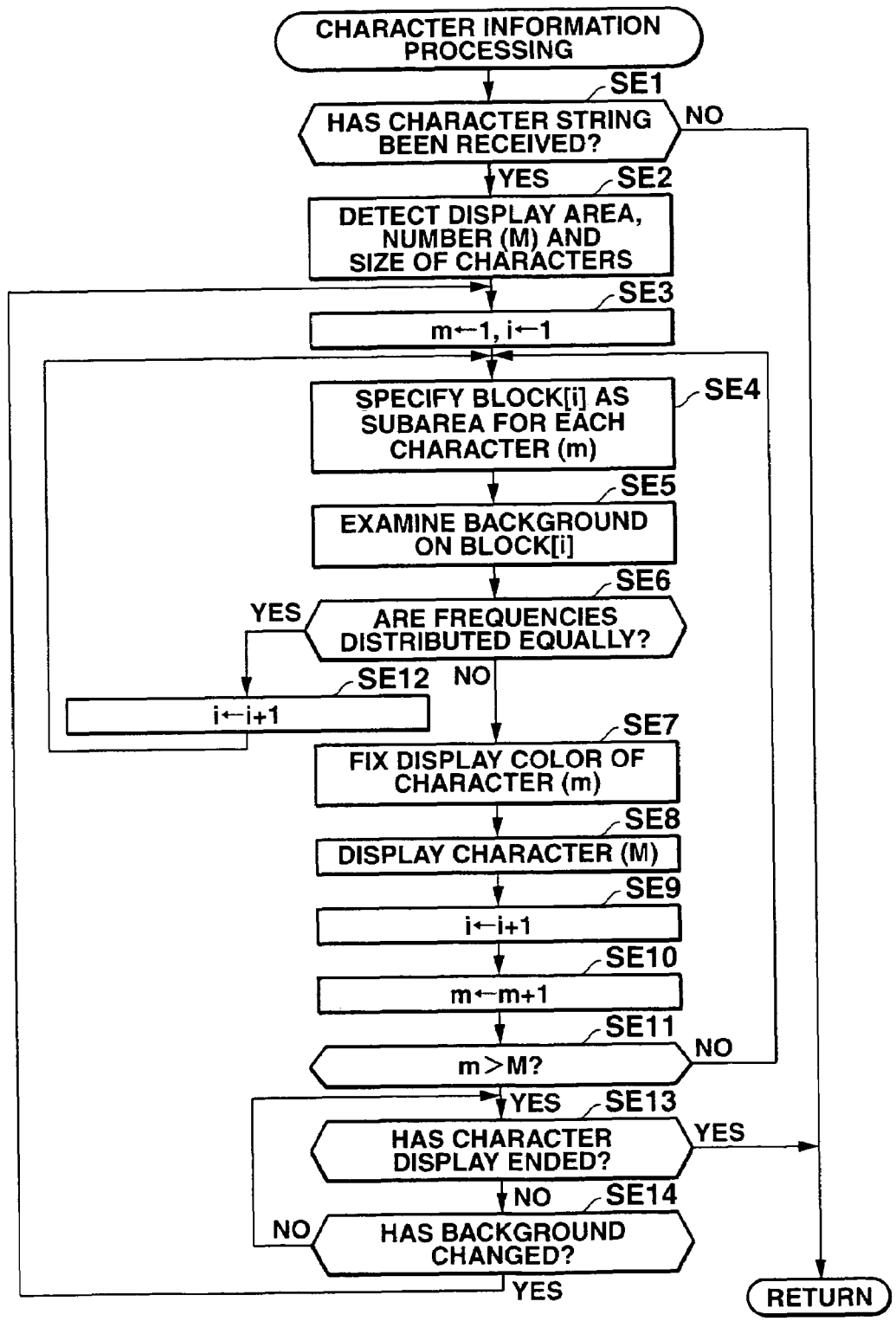
FIG. 16 is a flowchart indicative of character information processing to be performed in the fifth embodiment in the main routine of FIG. 2.

FIG. 16 is a flowchart indicative of character information processing to be performed in the fifth embodiment. The control first determines whether a character string has been received (step SE1). If not, the control terminates the flowchart and returns to the main routine. When the character string has been received, the control detects the display area, number (M) and size of the characters from among the character information (step SE2). Then, the control sets a variable m that specifies each of the characters in the character information to be displayed to "1" and also sets a variable i that specifies each subarea block in the display area to "1" (step SE3). The control then increments the values of m and i while performing a looping process including steps SE4-SE13.

In the looping process, the control specifies an i-th block "i" as an m-th character subarea (step SE4). That is, the control first specifies a first block [1] as a subarea for the head character. The control then examines the background of the block [i] (step SE5), and determines whether the frequencies of the respective hues and those of the respective luminances of the pixels of the subarea are equally distributed in the corresponding histograms (step SE6). If not, the control fixes the display color of the m-th character (step SE7) and then displays the character in that display color (step SE8). The control then increments the value of m and then specifies the next character (step SE9), increments the value of i and then specifies the next block [i] (step SE 10). The control then determines whether or not the value of m has exceeded the number of characters M (step SE11). If not, the control goes to step SE4 where the control repeats the looping process including steps SE4-SE11.

Figure 17:
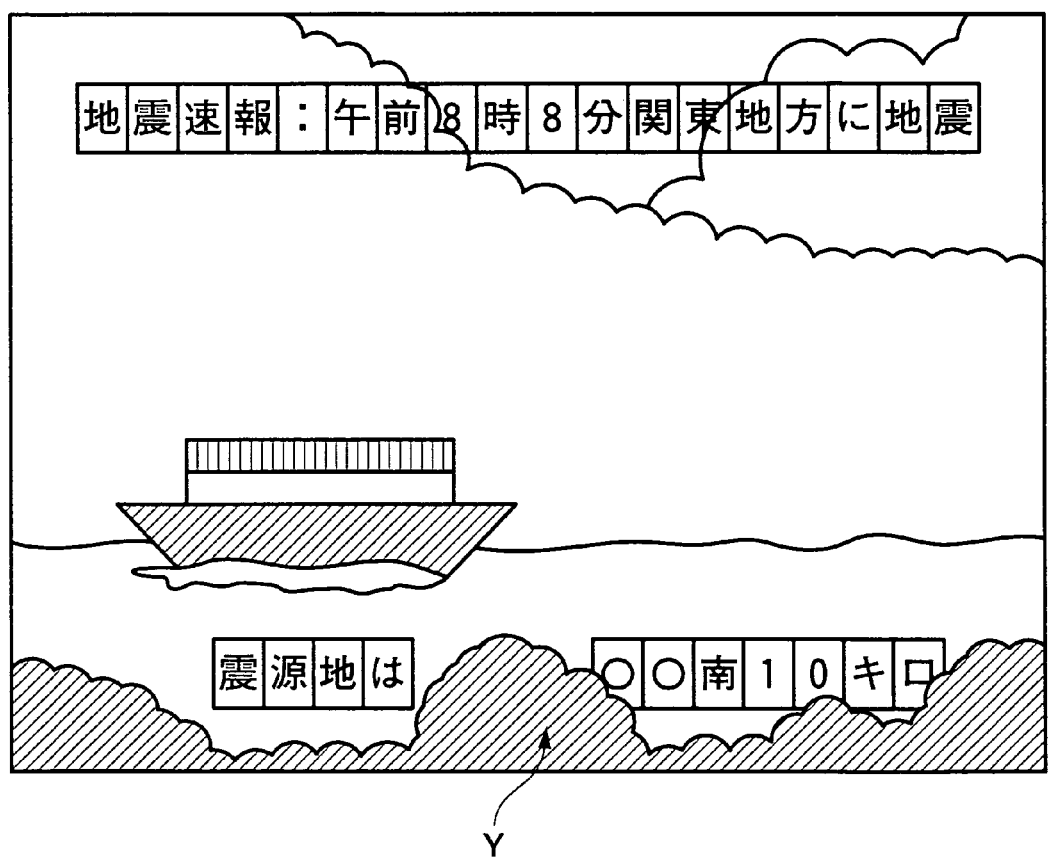
FIG. 17 illustrates two blank subareas formed in the lower part of the displayed picture in the fifth embodiment.

When the control determines at step SE6 that the frequencies of the respective pixel hues in the block [i] are equally distributed in the histogram, or the character display is impossible, the control then increments the value of i to make the block [i] blank (step SE12). The control then goes to step SE4 where it repeats the looping process. FIG. 17 illustrates a case in which parts of the background Y where the characters are to be displayed are made blank. Similarly, when the frequencies of the respective luminances, or both the respective hues and the respective luminances, of the pixels are equally distributed in their histogram, the subareas where characters are to be displayed are made blank.

When the control determines at step SE11 that the value of m has exceeded M, the control determines whether the character display has ended (step SE13). If not, the control determines whether the background has changed during the character display (step SE14). If so, the control goes to step SE3 where it sets both the variables m and i to "1" and then performs the looping process including the steps SE4-SE14. If the background has not changed, the control determines at step SE13 whether the character display has ended. If so, the control returns to the main routine.

As described above, according to the fifth embodiment when the defined character display area includes a part where no appropriate character image can be created, the control then specifies as a new subarea a character display area different from that part from the character display area and then produces and displays the character image in the new subarea in a display color contrasting with its background color.

Thus, when a digital broadcast bearing character information multiplexed with video information is received, image processing can be performed in consideration of whether or not the video information representing the respective backgrounds of the characters to be displayed is suitable for the character display, thereby displaying the characters with high distinction without impairing the video quality.

Figure 18:
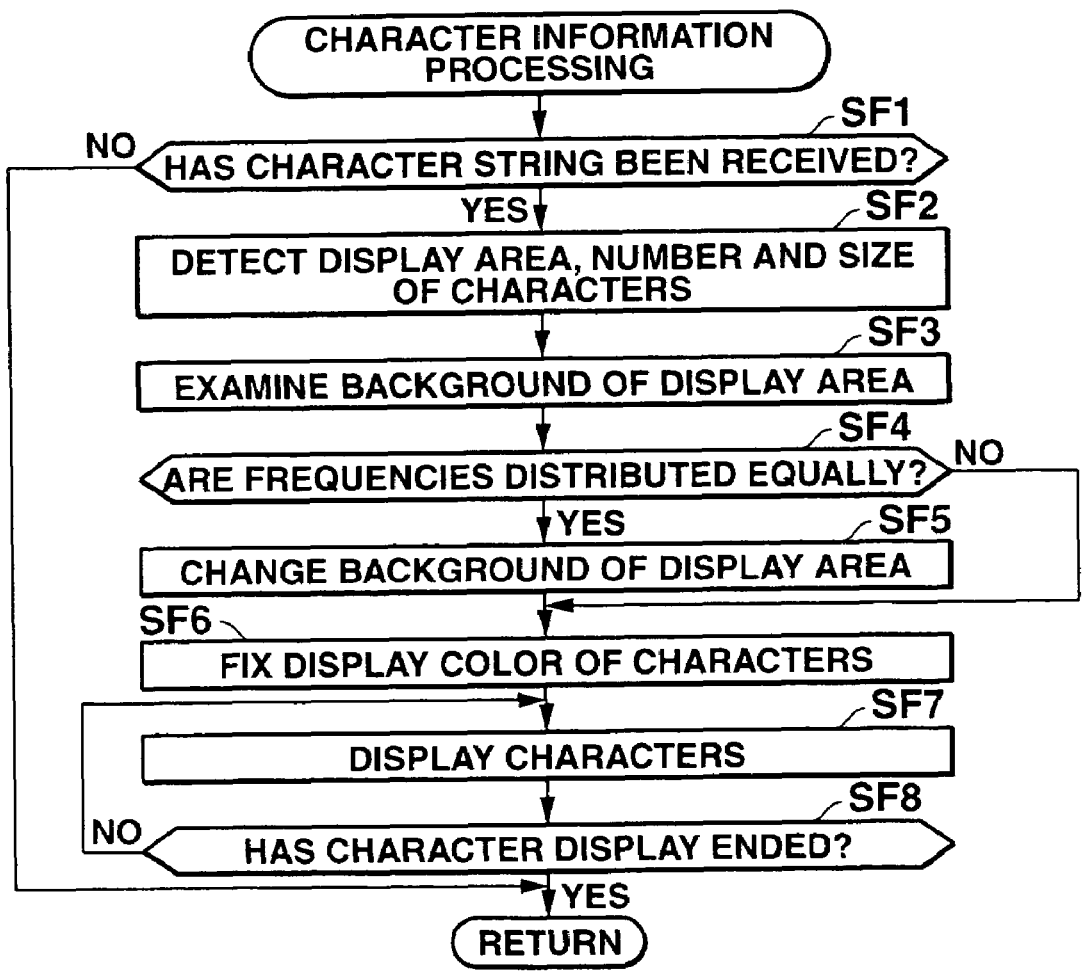
FIG. 18 is a flowchart of character information processing to be performed in the sixth embodiment in the main routine of FIG. 2.
Figure 19:
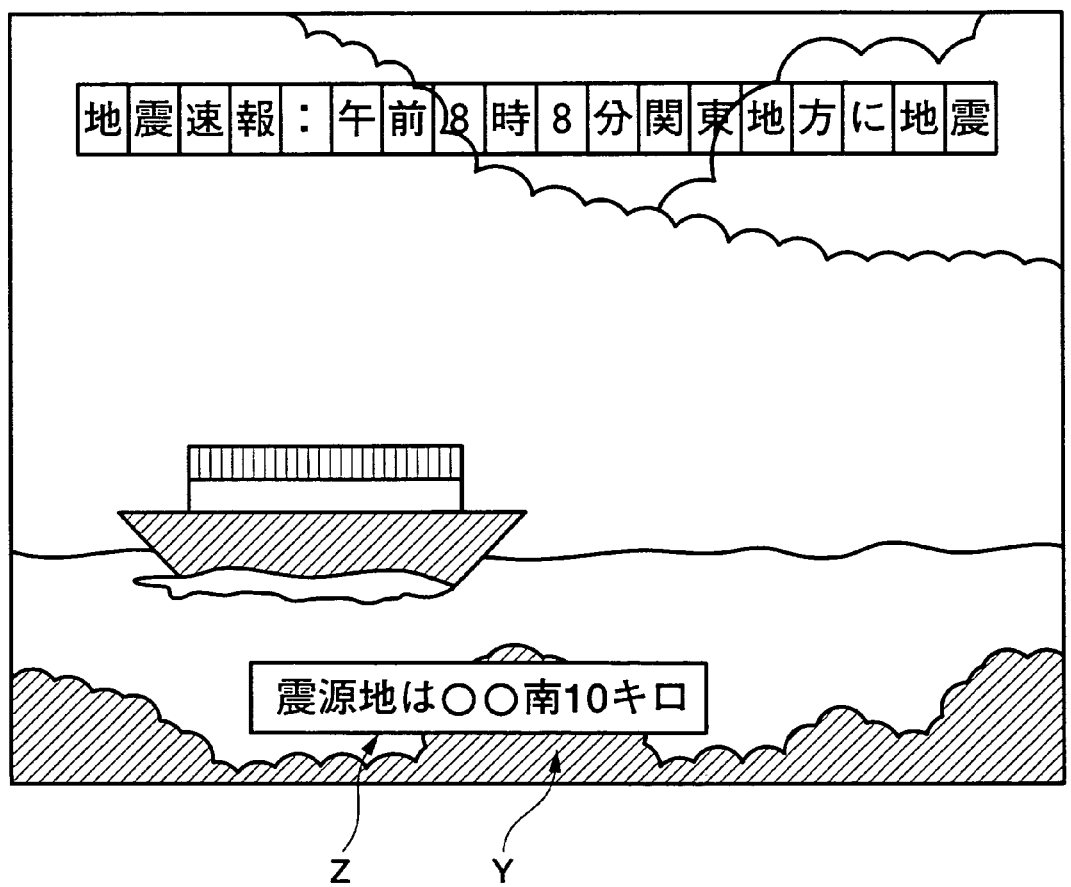
FIG. 19 illustrates a background of the display area in the seventh embodiment comprising a frame picture in which the characters are displayed.

Operation of a character display control process to be performed in the sixth embodiment will be described next with respect to a flowchart of FIG. 18. The control first determines whether a character string has been received (step SF1). If not, the control terminates this flowchart and returns to the main routine. If so, the control detects the display area, number and size of characters from among the character information (step SF2). The control then examines the background of the display area of the characters (step SF3). In this case, the control examines the hue of the background and then determines based on a result of the examination whether the character display is difficult, or the frequencies of the hues of the pixels of the background are equally distributed in the histogram (step SF4). If so, the control changes the hue or video information of the background of the display area to a frame picture of a single color (step SF5). After changing the hue of the background or when the hues of the pixels of the background are not equally distributed in the histogram, the control fixes the display color of the characters (step SF6) and then displays the characters in that display color (step SF7). Then, the control determines whether the character display has ended (step SF8). If so, the control then returns to the main routine. FIG. 19 illustrates that the character information is displayed in a background display area defined by a rectangular frame picture of a single color.

As described above, according to the sixth embodiment, when the defined character display area includes a particular area in where no character image can not be created, the hue of the video information corresponding to that display area is changed, and a new image of the character is produced and displayed in that new display area.

Thus, when a digital broadcast bearing character information multiplexed with video information is received, image processing can be performed in consideration of whether or not the hue of the video information that composes the background of a character to be displayed is appropriate for character display, thereby displaying the character with high distinction without impairing the video quality.

Next, a character display control process to be performed in the seventh embodiment will be described next. This process is basically the same as that of the sixth embodiment of FIG. 18 and hence further presentation of its flowchart will be omitted. While in the sixth embodiment the hue of the video information corresponding to the character display area was examined at step SF6, in the seventh embodiment the luminance of video information corresponding to the character display area is examined. If the character display is difficult, the luminance of the background of the display area is changed. For example, when the luminance increases, character information with a decreasing luminance is displayed and vise versa.

As described above, according to the sixth embodiment, when the fixed character display area includes a particular area where no appropriate character image can be created, the luminance of the video information corresponding to that display area is changed, and a striking image of the character is produced and displayed in the new display area.

Thus, when a digital broadcast bearing character information multiplexed with video information is received, image processing can be performed in consideration of whether or not the luminance of the video information that composes the background of the character to be displayed is appropriate for the character display, thereby displaying the character with high distinction without impairing the video quality.

Then, a character information display control process to be performed in the eighth embodiment will be described next with respect to FIG. 20. The control first determines whether a character string has been received (step SG1). If not, the control terminates the flowchart and returns to the main routine. If the character string has been received, the control then detects the display area, number and size of characters from the character information (step SG2). The control then examines the background, or its hue, of the character display area (step SG3). The control then determines based on a result of the examination whether the frequencies of the hues of pixels of the background are equally distributed in its histogram, or whether the character information displayed on the background is with low distinction or inconspicuous (step SG4). If the frequencies are equally distributed, the control selects any desired one from among a predetermined number of colors and sets it as a display color for the character (step SG5). The control then sets a flag ONF to "1" (step SG6).

Then, at steps SG7-SG12 the control displays the characters depending on the value of the ONF, or determines whether the ONF is "1" (step SG7). If the ONF is "1", the control displays the characters (step SG8). If the ONF is "0", the control erases the characters (step SG9a) and then changes the display color (step SG6b). After displaying or erasing the characters, thereby changing their display color, the control stores a predetermined time, for example of one second, in a register T (step SG10). The value of the register T is decremented in accordance with a timer interrupt signal, and the control determines whether a predetermined time has elapsed and the value of the register T has reached "0" (step SG11). When the value of the register T has reached "0", the control inverts the value of the flag ONF (step SG12) and then goes to step SG7. Thus, each time the looping operation of steps SG7-SG12 is repeated, the character information displayed on the picture blinks while changing its display color at predetermined periods.

If the control determines at step SG11 that the value of the register T has not reached "0", the control determines whether the character display has ended (step SG13). If not, the control determines at step SG11 whether the value of the register T has reached "0". If the character display has ended, the control then returns to the main routine. If the control determines at step SG4 that there is some distinguishing characteristic recognized in the distribution of the frequencies of the pixel hues of the background, or the frequencies of the pixel hues are not distributed equally, in the histogram, the control fixes a display color of the character depending on a result of the examination (step SG14) and then displays the characters in that display color (step SG15). Then, the control determines whether the character display has ended (step SG16). If so, the control returns to the main routine.

Figure 20:
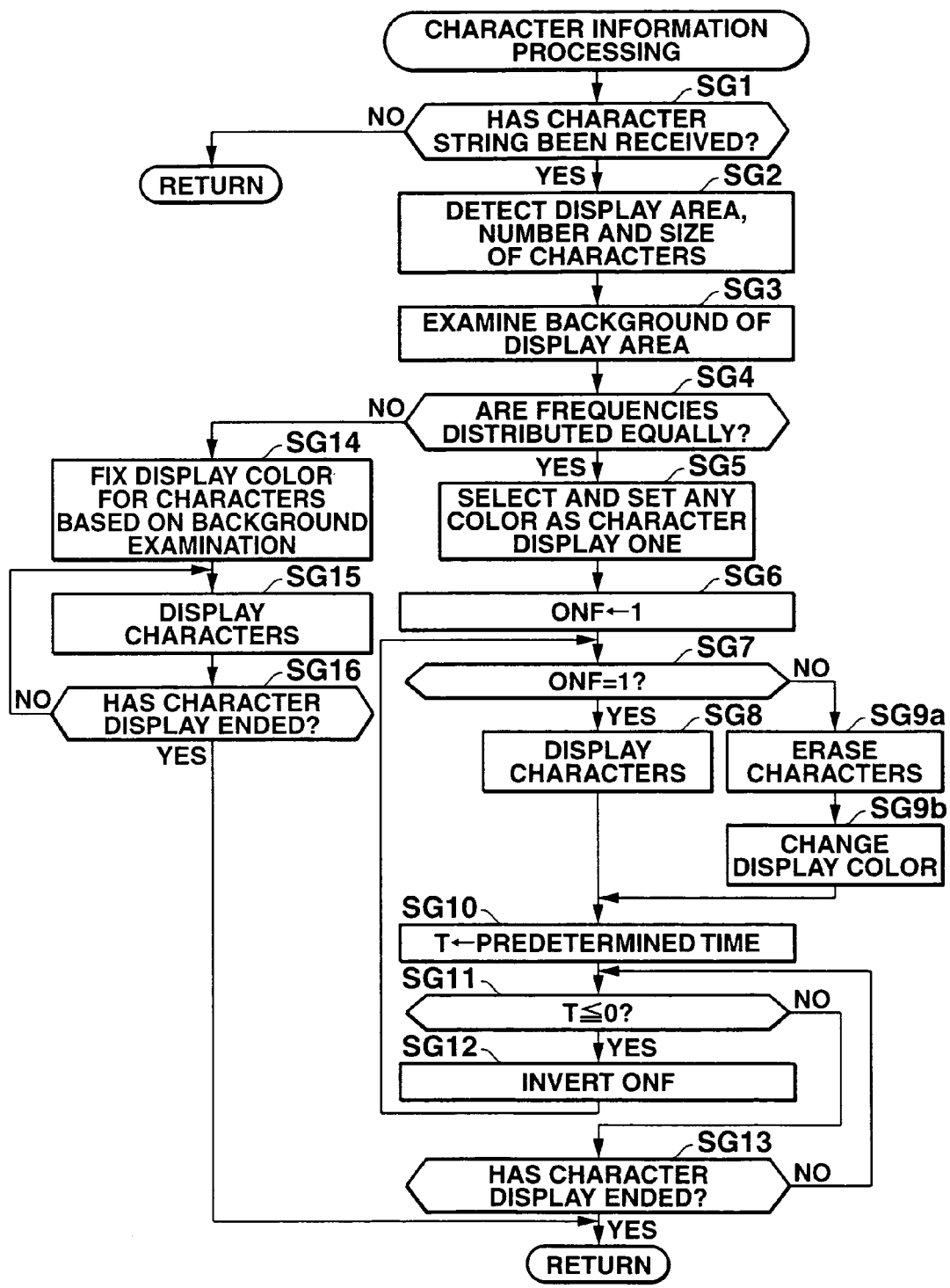
FIG. 20 is a flowchart indicative of character information processing to be performed in the eighth embodiment in the main routine of FIG. 2.

When the background has changed during the display period although not shown in FIG. 20, the control goes to step SG3, where it examines the background of the display area of the characters and then repeats step SG4 and the subsequent steps.

While in the eighth embodiment if the frequencies of the pixel hues of the background are equally distributed in the histogram the character information is illustrated as displayed while blinking, if the frequencies of the pixel luminances, or both the pixel hues and luminances, of the background are equally distributed the character information may be displayed while blinking.

As described above, according to the eighth embodiment if it is known based on a result of analysis of the video information corresponding to the defined display area for the characters that no appropriate character images can be created in the character display area, character images whose display color changes while blinking at predetermined periods are produced and displayed.

Thus, when a digital broadcast bearing character information multiplexed with video information is received, image processing can be performed in consideration of whether or not the hue of the video information that composes the background of characters to be displayed is appropriate for the character display, thereby displaying the characters with high distinction without impairing the video quality.

Figure 21:
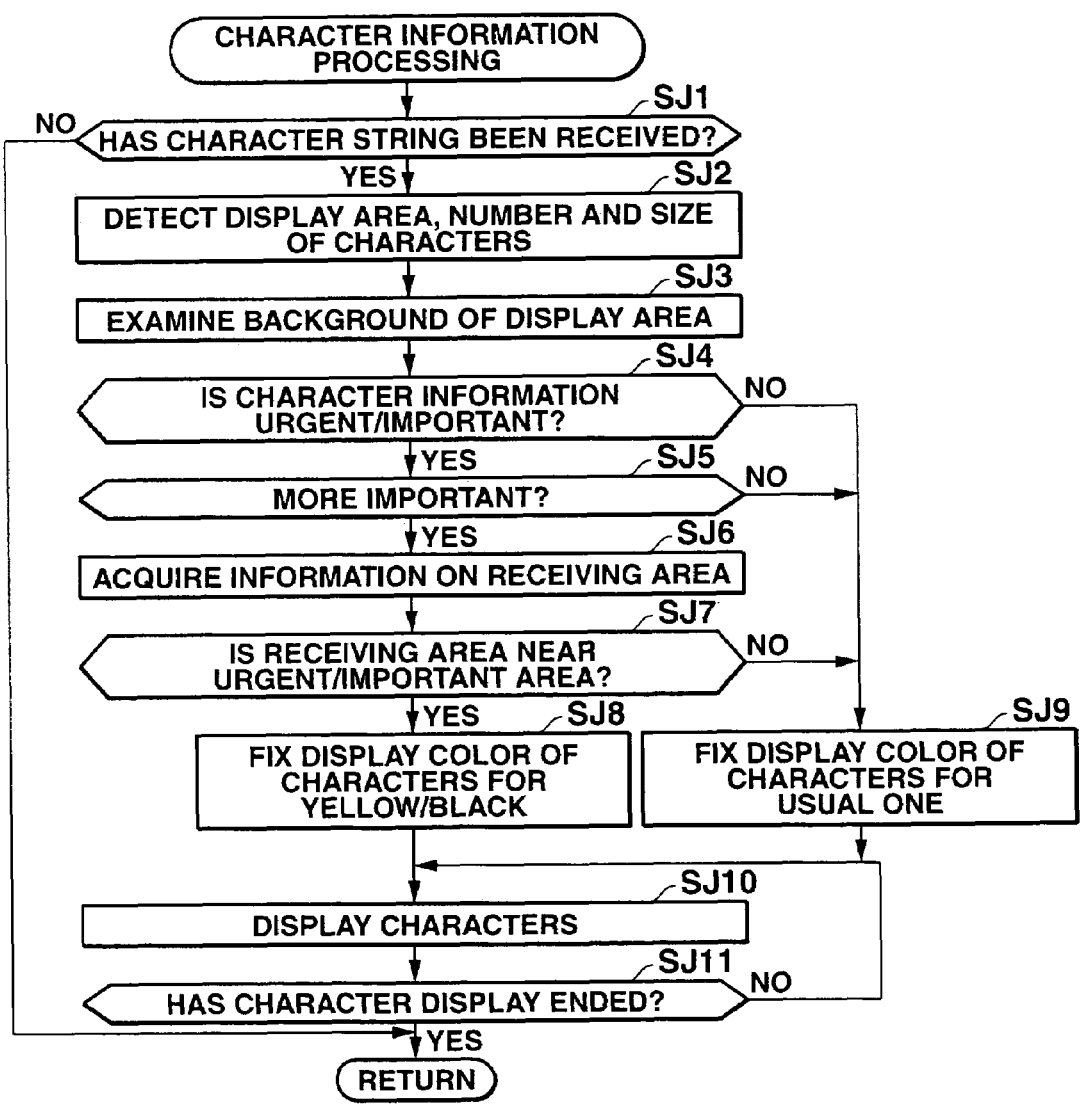
FIG. 21 is a flowchart indicative of character information processing to be performed in the ninth embodiment in the main routine of FIG. 2.

Then, a character information display control process to be performed in the ninth embodiment will be described next with the respect to a flowchart of FIG. 21. The control first determines whether a character string has been received (step SJ1). If not, the control then terminates the flowchart and returns to the main routine. If the character string is received, the control detects the display area, number, size of the characters and identification data from among the character information (step SJ2). The identification data includes detailed data on the character information. More specifically, it includes data indicative of whether or not the content of the character information is urgent, important or more important, and data indicative of urgent or important regions. Then, the control examines the background of the display area of the characters (step SJ3). In this case, the control examines the hue of the background. Alternatively, it may examine the luminance, or both the hue and luminance, of the background.

Then, the control checks up on the details of the identification data. First, it determines whether the content of the character information is urgent or important (step SJ4). If so, the control further determines whether the content of the character information is more important (step SJ5). If so, the control acquires information on an area or position where the receiver is located at present, using a STB (Set Top Box) and/or a GPS (step SJ6). Then, the control determines whether the area included in the information is near the urgent or important region (step SJ7). If so, the control determines that the characters should be displayed, filled-in with alternating diagonal yellow and black stripes (step SJ8). That is, when the character information includes special information indicative of warning, the control fixes the display color of the characters in an emphasized mode indicative of warning in order to attract the view's attention.

If the control determines at step SJ4 that the content of the information to be displayed is neither urgent nor important, at step SJ5 that the content of the character information is not more important or at step SJ7 that the receiving area indicated by the information is safely away from the urgent or important region, the control then determines that the display color of the characters should be a general color based on the examination of the background thereof (step SJ9).

After the determination, the control displays the characters in the fixed color or pattern (step SJ10). Then, the control determines whether the character display has ended (step SJ11). If so, the control erases the displayed character information and then returns to the main routine.

As described above, according to the ninth embodiment the control analyzes the character information and determines whether the character information includes special information indicative of warning. If not, the control produces images of the characters in a general mode based on the examination of the background and displays them. If the character information includes some special information, the control creates and displays images of the characters in an emphasized mode indicative of warning.

Thus, when a digital broadcast bearing character information multiplexed with video information is received, and the character information to be displayed includes special information indicative of warning, the characters can be displayed with high distinction such as attracts the viewer's attention.

Figure 22:
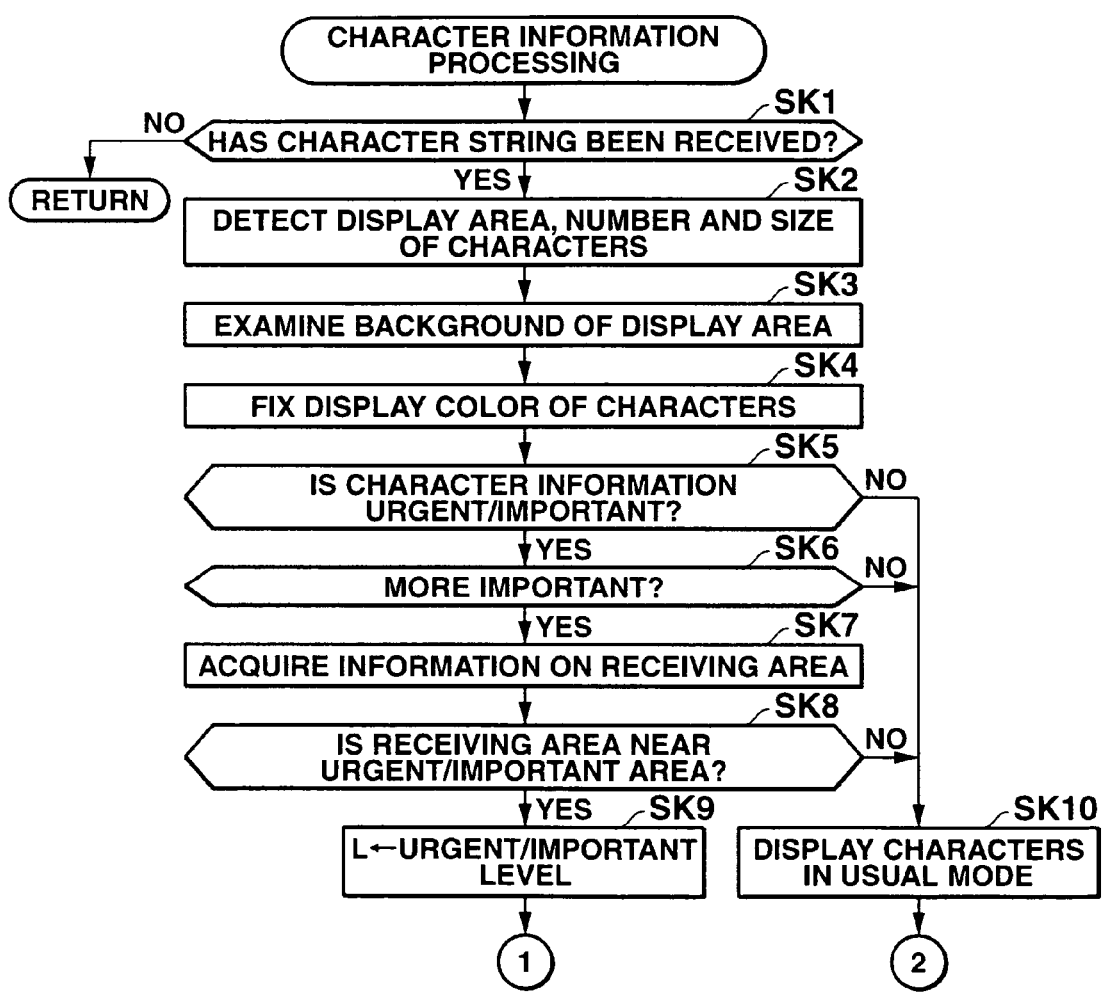
FIG. 22 is a flowchart indicative of character information processing to be performed in the tenth embodiment in the main routine of FIG. 2.

A character information display control process to be performed in the tenth embodiment will be described next with respect to flowcharts of FIGS. 22 and 23. In FIG. 22, the control first determines whether a character string has been received (step SK1). If not, the control terminates the flowchart and returns to the main routine. If the character string has been received, the control detects the display area, number, and size of characters and identification data from among the character information (step SK2). The identification data includes detailed data on the character information. More specifically, as in the ninth embodiment the identification data includes data indicating whether or not the content of the character information is urgent, important or more important, and data indicative of urgent or important regions. Then, the control examines a background of the display area of characters (step SK3). In this case, the control examines the hue of the background. Alternatively, it may examine either the luminance, or both the hue and luminance, of the background. The control then fixes a display color of the characters based on a result of the examination (step SK4).

Then, the control checks up on the details of the identification data. First, the control determines whether the content of the character information is urgent or important (step SK5). If so, the control further determines whether the content of the character information is more important (step SK6). If so, the control acquires information on an area where the receiver is located at present (step SK7). For example, as in the ninth embodiment the control may acquire the present position of the receiver using the STB or GPS. The control then determines whether the location of the receiver is near the urgent or important region (step SK8). If so, the control detects a level of urgency and importance of the region and then stores a value representing the level in a register L (step SK9). For example, the control stores a high level or urgency of importance as "4"; a medium level as "2"; and a low level as "1".

If the control determines at step SK5 that the content of the information to be displayed is neither urgent nor important, at step SK6 that the content of the information is not more important or at step SK8 that the location of the receiver is safely away from the urgent or important region, the control then displays the characters in a general mode (step SK10).

Figure 23:
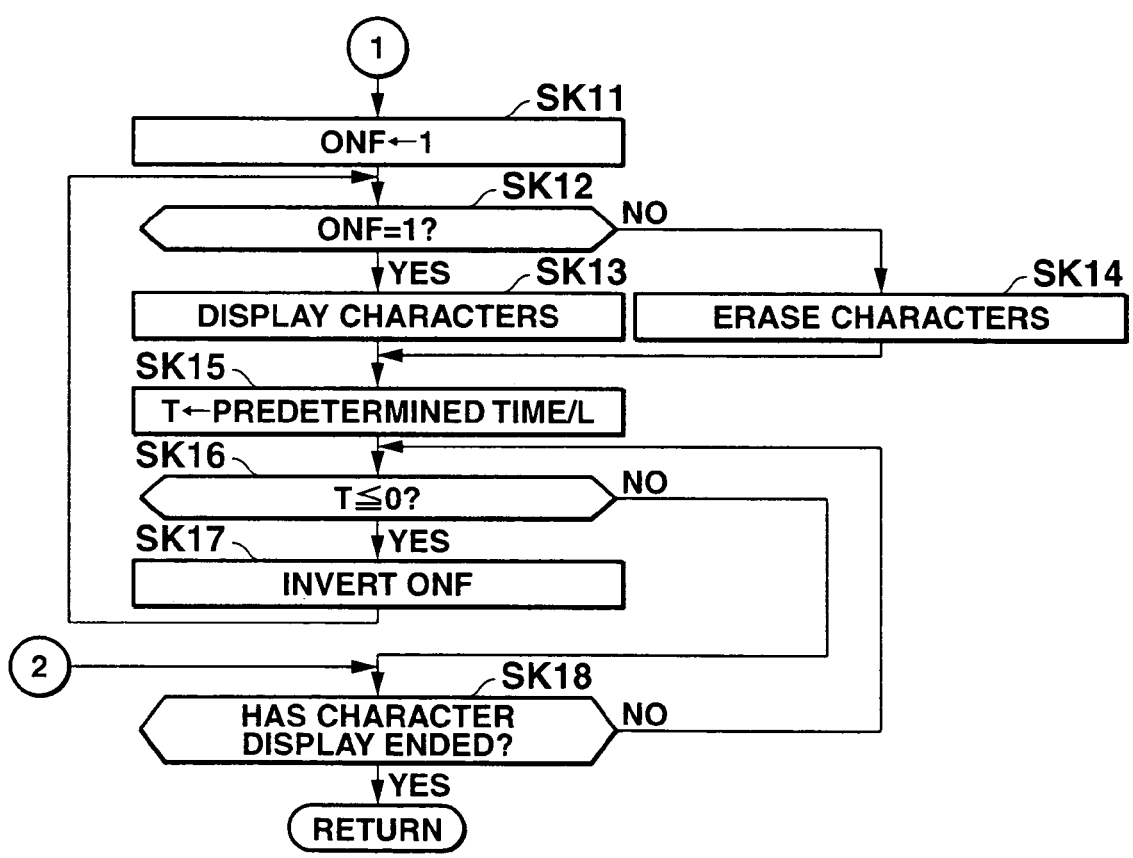
FIG. 23 is a flowchart of character information processing continued to FIG. 22 to be performed in the tenth embodiment.

After storing the value indicative of the level of urgency or importance in the register L, in FIG. 23 the control sets the flag ONF to "1" (step SK11) and then displays the characters in a bright state or erases them depending on the value of the ONF. That is, the control then determines whether the ONF is "1" (step SK12). If so, the control displays the characters (step SK13). If the ONF is "0", the control erases the characters (step SK14). Thereafter, the control stores in a register T a value obtained by dividing a predetermined time, for example of one second, by the value of the register L (step SK15).

Since the value of the register T is decremented in accordance with timer interrupt signals, the control determines whether time has reached the value of the register T (step SK16). If so, the controller inverts the value of the ONF (step SK17) and then goes to step SK12. When the control determines at step SK16 that the value of the register T has not reached "0", the control then determines whether the character display has ended (step SK18). If not, the control determines at step SK16 whether the value of the register T has reached "0".

Thus, as long as the character display continues, the character information displayed on the picture blinks at periods depending on the level of emergency or importance. For example, when the predetermined time is set to one second and the content of the character information represents a high level of urgency or importance, the displayed character information blinks at high speeds, for example, at periods of 0.25 seconds; when the content of the character information represents a medium level, the displayed character information blinks at a period of 0.5 seconds; and when the content of the character information represents a low level, the character information blinks at a period of one second. When the control determines at step SK 18 that the character display has ended, it erases the displayed character information and then returns to the main routine.

Even after displaying the characters in a general mode at step SK10 of FIG. 22, the control determines whether the character display has ended at step SK18 of FIG. 23. If so, it erases the displayed characters and then returns to the main routine.

As described above, according to the tenth embodiment the control analyzes the character information and determines whether the character information includes special information indicative of warning. If not, the control produces images of the characters in a general mode based on the background examination and displays them. If the control determines that the character information includes some special information, it creates and displays images of the characters in an emphasized mode indicative of warning. Thus, if character information multiplexed with video information born by a received digital broadcast includes special information indicative of warning, the characters can be displayed with high distinction such as attracts the viewer's attention as in the ninth embodiment.

While in the aforementioned respective embodiments hardware including the FIG. 4 hue examining circuit and the FIG. 7 luminance examining circuit has been illustrated as used to analyze the video information corresponding to the character display area, a display control program or software to be executed by the CPU 12 may be used to analyze the video information. A remarkable advancement of hardware techniques in the recent year has developed CPUs of a clock rate of several GHz. Inexpensive miniaturized CPUs of clock rates on the order of 100 MHz are easily available.

Thus, a CPU of a clock rate of 100 MHz can be mounted on the mobile receiver of each of the embodiments. In this case, since the clock period is 1 ns (nanosecond), it is considered that the time required for examining the hue or luminance of one pixel is several 10-odd ns. When the processing time of one pixel is 20 ns at the outside and the two (upper and lower) character display areas are composed of 36000 pixels, the processing time required for examining the hues and luminance of all the pixels is calculated as $2 \times 18000 \times 20 \times 10^{-9}$ s=$0.72 \times 10^{-3}$ s=0.72 ms.

Since in the ground wave digital broadcast 24 frame images per second are created, a maximum image processing time for one frame is 40 ms, apart from voice information. Performing image processing about all the video and character information for one frame is required during that time period of 40 ms. Since the time required for examining the hues or luminances of all the pixels is 0.72 ms, the hue and luminance of the character display area can be examined using software even when the time required to fix the display color, luminance or both of the characters and the time required for processing the video information on the background are added. In this case, the hue and luminance examining circuits as hardware are not needed and the cost of the articles is reduced.

While in the respective aforementioned embodiments the present invention has been illustrated using the mobile receiver, the present invention is not limited to this device. It is obvious from the descriptions of the respective embodiments that the present invention is also applicable to large stationary receivers, mobile telephones and PDAs (Personal Digital Assistants) capable of receiving ground-wave digital broadcasts and all other receivers that display the video and character information on the same picture.

While in the respective aforementioned embodiments the inventions of the display control apparatus in which the CPU executes the display control program stored beforehand in the ROM have been described, a display control program stored beforehand in an external recording medium such as a CD-ROM or a display control program downloaded from an external server via a network and installed may be executed by the CPU.

In this respect, the invention provides a program that includes the steps of, in response to reception of a television broadcast signal bearing video and character information is received, defining a display area for characters to be displayed on a display screen of predetermined display means based on information on the display position, number and size of the characters included in the character information; analyzing the video information corresponding to the character display area defined in the defining step and producing a character image in the character display area based on a result of the analysis in the analyzing step.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-398720 filed on Nov. 28, 2003 and each including specification, claims, drawings and summary. The disclosure of the above Japanese patent application is incorporated herein by reference in its entirety.

What is claimed is:

1. A display control apparatus comprising:
   a character information analyzer, responsive to reception of a television broadcast signal bearing video information and character information, for defining a display area for characters contained in the character information on a display picture based on a display position, number and size of the characters;
   a video information analyzer that analyzes video information corresponding to the display area for the characters defined by the character information analyzer; and
   a character image producing unit that produces an image of each of the characters to be displayed in the display area based on a result of the analysis by the video information analyzer;
   wherein the video information analyzer divides the display area for the characters defined by the character information analyzer into subareas for the respective characters, and analyzes a hue of video information corresponding to each subarea, and the character image producing unit sets in each subarea a hue different from that of the video information analyzed by the video information analyzer and produces an image of each character in a display color with the set hue in that subarea.

2. The display control apparatus of claim 1, wherein when moving a character string while displaying it in the display area, the character image producing unit produces an image of each character with a display color of the hue set in a respective subarea each time the character string is moved.

3. A display control apparatus comprising:
- a character information analyzer, responsive to reception of a television broadcast signal bearing video information and character information, for defining a display area for characters contained in the character information on a display picture based on a display position, number and size of the characters;
- a video information analyzer that analyzes video information corresponding to the display area for the characters defined by the character information analyzer; and
- a character image producing unit that produces an image of each of the characters to be displayed in the display area based on a result of the analysis by the video information analyzer;
- wherein the video information analyzer is responsive to the video information changing while the character information is being displayed to analyze video information corresponding to the display area for the characters, and the character information producing unit produces the images of the characters in the display area for the characters each time the video information analyzer analyzes the video information.

4. A display control apparatus comprising:
- a character information analyzer, responsive to reception of a television broadcast signal bearing video information and character information, for defining a display area for characters contained in the character information on a display picture based on a display position, number and size of the characters;
- a video information analyzer that analyzes video information corresponding to the display area for the characters defined by the character information analyzer; and
- a character image producing unit that produces an image of each of the characters to be displayed in the display area based on a result of the analysis by the video information analyzer;
- wherein when the display area for the characters defined by the character information analyzer includes a particular area part where an appropriate image of a character cannot be created based on a result of the analysis by the video information analyzer, the character image producing unit specifies as a new display area the defined display area for the characters excluding the particular area part in spite of the display position included in the character information and produces images of the characters in the new display area.

5. A display control apparatus comprising:
- a character information analyzer, responsive to reception of a television broadcast signal bearing video information and character information, for defining a display area for characters contained in the character information on a display picture based on a display position, number and size of the characters;
- a video information analyzer that analyzes video information corresponding to the display area for the characters defined by the character information analyzer; and
- a character image producing unit that produces an image of each of the characters to be displayed in the display area based on a result of the analysis by the video information analyzer;
- wherein when the display area for the characters defined by the character information analyzer includes a particular area part where an appropriate image of a character cannot be created based on a result of the analysis by the video information analyzer, the character image producing unit changes a hue of the video information corresponding to the display area and produces images of the characters to be displayed in the display area.

6. A display control apparatus comprising:
- a character information analyzer, responsive to reception of a television broadcast signal bearing video information and character information, for defining a display area for characters contained in the character information on a display picture based on a display position, number and size of the characters;
- a video information analyzer that analyzes video information corresponding to the display area for the characters defined by the character information analyzer; and
- a character image producing unit that produces an image of each of the characters to be displayed in the display area based on a result of the analysis by the video information analyzer;
- wherein when the display area for the characters defined by the character information analyzer includes a particular area part where an appropriate image of a character cannot be created based on a result of the analysis by the video information analyzer, the character image producing unit changes a luminance of the video information corresponding to the display area and produces images of the characters with a changed luminance that is different from an original luminance.

7. A display control apparatus comprising:
- a character information analyzer, responsive to reception of a television broadcast signal bearing video information and character information, for defining a display area for characters contained in the character information on a display picture based on a display position, number and size of the characters;
- a video information analyzer that analyzes video information corresponding to the display area for the characters defined by the character information analyzer; and
- a character image producing unit that produces an image of each of the characters to be displayed in the display area based on a result of the analysis by the video information analyzer;
- wherein when the display area for the characters defined by the character information analyzer includes a particular area part where an appropriate image of a character cannot be created based on a result of the analysis by the video information analyzer, the character image producing unit produces an image of the character whose display color changes while blinking at predetermined periods.

8. A display control apparatus comprising:
- a character information analyzer, responsive to reception of a television broadcast signal bearing video information and character information, for defining a display area for characters contained in the character information on a display picture based on a display position, number and size of the characters;
- a video information analyzer that analyzes video information corresponding to the display area for the characters defined by the character information analyzer; and
- a character image producing unit that produces an image of each of the characters to be displayed in the display area based on a result of the analysis by the video information analyzer;

wherein the character information analyzer determines whether or not the character information includes special information indicative of a warning, and the character image producing unit is responsive to the character information analyzer determining that the character information includes no special information to produce an image of the character in an ordinary mode, and is also responsive to the character information analyzer determining that the character information includes the special information to produce an image of the character in an emphasized mode indicative of the warning.

9. The display control apparatus of claim 8, wherein the character information analyzer analyzes a degree of urgency or importance of the special information, and the character image producing unit produces an image of the character blinking at periods depending on the degree of urgency or importance.

10. A recording medium having stored thereon a computer readable display control program for controlling a display control apparatus to perform functions comprising:
responsive to reception of a television broadcast signal bearing video information and character information, defining a display area for characters contained in the character information on a display picture based on a display position, number and size of the characters;
analyzing video information corresponding to the display area for the defined characters; and
producing an image of each of the characters to be displayed in the display area based on a result of the analysis;
wherein the analyzing comprises dividing the display area for the defined characters into subareas for the respective characters, and analyzing a hue of video information corresponding to each subarea, and the producing comprises setting in each subarea a hue different from that of the analyzed video information and producing an image of each character with a display color of the set hue in that subarea.

11. The display control program of claim 10, wherein when moving a character string while displaying it in the display area, the producing step produces an image of each character with a display color of the hue set in a respective subarea each time the character string is moved.

12. A recording medium having stored thereon a computer readable display control program for controlling a display control apparatus to perform functions comprising:
responsive to reception of a television broadcast signal bearing video information and character information, defining a display area for characters contained in the character information on a display picture based on a display position, number and size of the characters;
analyzing video information corresponding to the display area for the defined characters; and
producing an image of each of the characters to be displayed in the display area based on a result of the analysis;
wherein the analyzing is performed responsive to the video information changing while the character information is being displayed to analyze video information corresponding to the display area for the characters, and the producing produces comprises producing the images of the characters in the display area for the characters each time the the video information is analyzed.

13. A recording medium having stored thereon a computer readable display control program for controlling a display control apparatus to perform functions comprising:
responsive to reception of a television broadcast signal bearing video information and character information, defining a display area for characters contained in the character information on a display picture based on a display position, number and size of the characters;
analyzing video information corresponding to the display area for the defined characters; and
producing an image of each of the characters to be displayed in the display area based on a result of the analysis;
wherein when the display area for the defined characters includes a particular area part where an appropriate image of a character cannot be created based on a result of the analysis, the producing is performed to specify as a new display area the defined display area for the characters excluding the particular area part in spite of the display position included in the character information and to produce images of the characters in the new display area.

14. A recording medium having stored thereon a computer readable display control program for controlling a display control apparatus to perform functions comprising:
responsive to reception of a television broadcast signal bearing video information and character information, defining a display area for characters contained in the character information on a display picture based on a display position, number and size of the characters;
analyzing video information corresponding to the display area for the defined characters; and
producing an image of each of the characters to be displayed in the display area based on a result of the analysis;
wherein when the display area for the defined characters includes a particular area part where an appropriate image of a character cannot be created based on a result of the analysis, the producing is performed to change a hue of the video information corresponding to the display area and to produce images of the characters to be displayed in the display area.

15. A recording medium having stored thereon a computer readable display control program for controlling a display control apparatus to perform functions comprising:
responsive to reception of a television broadcast signal bearing video information and character information, defining a display area for characters contained in the character information on a display picture based on a display position, number and size of the characters;
analyzing video information corresponding to the display area for the defined characters; and
producing an image of each of the characters to be displayed in the display area based on a result of the analysis;
wherein when the display area part for the defined characters includes a particular area where an appropriate image of a character cannot be created based on a result of the analysis, the producing is performed to change a luminance of the video information corresponding to the display area and to produce images of the characters with a changed luminance different from an original luminance.

16. A recording medium having stored thereon a computer readable display control program for controlling a display control apparatus to perform functions comprising:
responsive to reception of a television broadcast signal bearing video information and character information, defining a display area for characters contained in the character information on a display picture based on a display position, number and size of the characters;

analyzing video information corresponding to the display area for the defined characters; and producing an image of each of the characters to be displayed in the display area based on a result of the analysis;

wherein when the display area for the defined characters includes a particular area part where an appropriate image of a character cannot be created based on a result of the analysis, the producing is performed to produce an image of the character whose display color changes while blinking at predetermined periods.

17. A recording medium having stored thereon a computer readable display control program for controlling a display control apparatus to perform functions comprising:

responsive to reception of a television broadcast signal bearing video information and character information, defining a display area for characters contained in the character information on a display picture based on a display position, number and size of the characters;

analyzing video information corresponding to the display area for the defined characters; and producing an image of each of the characters to be displayed in the display area based on a result of the analysis;

wherein the analyzing comprises determining whether or not the character information includes special information indicative of a warning, and the producing is performed when it is determined that the character information includes no special information to produce an image of the character in an ordinary mode, and when it is determined that the character information includes the special information to produce an image of the character in an emphasized mode indicative of the warning.

18. The recording medium of claim 17, wherein the analyzing analyzes a degree of urgency or importance of the special information, and the producing is performed to produce an image of the character blinking at periods depending on the degree of urgency or importance.

* * * * *